(12) United States Patent
Fleming

(10) Patent No.: US 8,209,709 B2
(45) Date of Patent: Jun. 26, 2012

(54) CROSS-PLATFORM EVENT ENGINE

(75) Inventor: Michael Fleming, San Leandro, CA (US)

(73) Assignee: Seven Networks, Inc., Redwood City, CA (US)

( * ) Notice: Subject to any disclaimer, the term of this patent is extended or adjusted under 35 U.S.C. 154(b) by 0 days.

(21) Appl. No.: 12/830,417

(22) Filed: Jul. 5, 2010

(65) Prior Publication Data

US 2011/0138402 A1   Jun. 9, 2011

Related U.S. Application Data

(63) Continuation of application No. 11/227,323, filed on Sep. 14, 2005, now Pat. No. 7,752,633.

(60) Provisional application No. 60/661,757, filed on Mar. 14, 2005.

(51) Int. Cl.
*G06F 13/00* (2006.01)

(52) U.S. Cl. ...................................... 719/318
(58) Field of Classification Search .................... 719/318
See application file for complete search history.

(56) References Cited

U.S. PATENT DOCUMENTS

| | | | |
|---|---|---|---|
| 222,458 A | 12/1879 | Connolly et al. | |
| 447,918 A | 3/1891 | Strowger | |
| 4,200,770 A | 4/1980 | Hellman et al. | |
| 4,255,796 A | 3/1981 | Gabbe et al. | |
| 4,276,597 A | 6/1981 | Dissly et al. | |
| 4,531,020 A | 7/1985 | Wechselberger et al. | |
| 4,807,182 A | 2/1989 | Queen | |
| 4,831,582 A | 5/1989 | Miller et al. | |
| 4,875,159 A | 10/1989 | Cary et al. | |
| 4,897,781 A | 1/1990 | Chang et al. | |
| 4,972,457 A | 11/1990 | O'Sullivan | |
| 5,008,853 A | 4/1991 | Bly et al. | |
| 5,159,624 A | 10/1992 | Makita | |
| 5,220,657 A | 6/1993 | Bly et al. | |
| 5,263,157 A | 11/1993 | Janis | |
| 5,283,856 A | 2/1994 | Gross et al. | |
| 5,357,431 A | 10/1994 | Nakada et al. | |
| 5,384,892 A | 1/1995 | Strong | |
| 5,386,564 A | 1/1995 | Shearer et al. | |
| 5,392,390 A | 2/1995 | Crozier | |
| 5,434,994 A | 7/1995 | Shaheen et al. | |
| 5,436,960 A | 7/1995 | Campana, Jr. et al. | |

(Continued)

FOREIGN PATENT DOCUMENTS

EP   0772327 A2   5/1997

(Continued)

OTHER PUBLICATIONS

Allchin, James Edward, "An Architecture for Reliable Decentralized Systems," Ph.D. Thesis, Georgia Institute of Technology, 185 pages, Sep. 1983.

(Continued)

*Primary Examiner* — Andy Ho
(74) *Attorney, Agent, or Firm* — Perkins Coie LLP

(57) ABSTRACT

A system and method for translating, synthesizing and acting upon disparate event sets is provided. The disclosed cross-platform event engine comprises an event module with information pertaining to various event inputs as they relate to different operating platforms and devices. Logic utilized by the cross-platform event engine determines how to handle a particular event within an operating environment. Methods of updating and training the engine are also provided.

21 Claims, 3 Drawing Sheets

U.S. PATENT DOCUMENTS

| | | |
|---|---|---|
| 5,438,611 A | 8/1995 | Campana, Jr. et al. |
| 5,479,472 A | 12/1995 | Campana, Jr. et al. |
| 5,487,100 A | 1/1996 | Kane |
| 5,493,692 A | 2/1996 | Theimer et al. |
| 5,519,606 A | 5/1996 | Frid-Nielsen et al. |
| 5,555,376 A | 9/1996 | Theimer et al. |
| 5,559,800 A | 9/1996 | Mousseau et al. |
| 5,572,571 A | 11/1996 | Shirai |
| 5,572,643 A | 11/1996 | Judson |
| 5,574,859 A | 11/1996 | Yeh |
| 5,581,749 A | 12/1996 | Hossain et al. |
| 5,600,834 A | 2/1997 | Howard |
| 5,603,054 A | 2/1997 | Theimer et al. |
| 5,604,788 A | 2/1997 | Tett |
| 5,613,012 A | 3/1997 | Hoffman et al. |
| 5,619,507 A | 4/1997 | Tsuda |
| 5,619,648 A | 4/1997 | Canale et al. |
| 5,623,601 A | 4/1997 | Vu |
| 5,625,670 A | 4/1997 | Campana, Jr. et al. |
| 5,625,815 A | 4/1997 | Maier et al. |
| 5,627,658 A | 5/1997 | Connors et al. |
| 5,630,081 A | 5/1997 | Rybicki et al. |
| 5,631,946 A | 5/1997 | Campana, Jr. et al. |
| 5,632,018 A | 5/1997 | Otorii |
| 5,634,053 A | 5/1997 | Noble et al. |
| 5,647,002 A | 7/1997 | Brunson |
| 5,652,884 A | 7/1997 | Palevich |
| 5,664,207 A | 9/1997 | Crumpler et al. |
| 5,666,530 A | 9/1997 | Clark et al. |
| 5,666,553 A | 9/1997 | Crozier |
| 5,680,542 A | 10/1997 | Mulchandani et al. |
| 5,682,524 A | 10/1997 | Freund et al. |
| 5,684,990 A | 11/1997 | Boothby |
| 5,689,654 A | 11/1997 | Kikinis et al. |
| 5,692,039 A | 11/1997 | Brankley et al. |
| 5,696,903 A | 12/1997 | Mahany |
| 5,701,423 A | 12/1997 | Crozier |
| 5,701,469 A | 12/1997 | Brandli et al. |
| 5,704,029 A | 12/1997 | Wright, Jr. |
| 5,706,211 A | 1/1998 | Beletic et al. |
| 5,706,502 A | 1/1998 | Foley et al. |
| 5,706,507 A | 1/1998 | Schloss |
| 5,710,918 A | 1/1998 | Lagarde et al. |
| 5,713,019 A | 1/1998 | Keaten |
| 5,715,403 A | 2/1998 | Stefik |
| 5,717,925 A | 2/1998 | Harper et al. |
| 5,721,908 A | 2/1998 | Lagarde et al. |
| 5,721,914 A | 2/1998 | DeVries |
| 5,727,202 A | 3/1998 | Kucala |
| 5,729,549 A | 3/1998 | Kostreski et al. |
| 5,729,704 A | 3/1998 | Stone et al. |
| 5,729,735 A | 3/1998 | Meyering |
| 5,742,905 A | 4/1998 | Pepe et al. |
| 5,745,360 A | 4/1998 | Leone et al. |
| 5,752,186 A | 5/1998 | Malackowski et al. |
| 5,752,246 A | 5/1998 | Rogers et al. |
| 5,754,938 A | 5/1998 | Herz et al. |
| 5,757,916 A | 5/1998 | MacDoran et al. |
| 5,758,088 A | 5/1998 | Bezaire et al. |
| 5,758,150 A | 5/1998 | Bell et al. |
| 5,758,322 A | 5/1998 | Rongley |
| 5,758,354 A | 5/1998 | Huang et al. |
| 5,758,355 A | 5/1998 | Buchanan |
| 5,765,171 A | 6/1998 | Gehani et al. |
| 5,778,346 A | 7/1998 | Frid-Nielsen et al. |
| 5,778,361 A | 7/1998 | Nanjo et al. |
| 5,781,614 A | 7/1998 | Brunson |
| 5,781,901 A | 7/1998 | Kuzma |
| 5,781,906 A | 7/1998 | Aggarwal et al. |
| 5,787,430 A | 7/1998 | Doeringer et al. |
| 5,787,441 A | 7/1998 | Beckhardt |
| 5,790,425 A | 8/1998 | Wagle |
| 5,790,790 A | 8/1998 | Smith et al. |
| 5,790,974 A | 8/1998 | Tognazzini |
| 5,793,413 A | 8/1998 | Hylton et al. |
| 5,794,210 A | 8/1998 | Goldhaber et al. |
| 5,799,318 A | 8/1998 | Cardinal et al. |
| 5,802,312 A | 9/1998 | Lazaridis et al. |
| 5,802,454 A | 9/1998 | Goshay et al. |
| 5,802,518 A | 9/1998 | Karaev et al. |
| 5,802,524 A | 9/1998 | Flowers et al. |
| 5,806,074 A | 9/1998 | Souder et al. |
| 5,809,242 A | 9/1998 | Shaw et al. |
| 5,809,415 A | 9/1998 | Rossmann |
| 5,818,437 A | 10/1998 | Grover et al. |
| 5,819,172 A | 10/1998 | Campana, Jr. et al. |
| 5,819,274 A | 10/1998 | Jackson, Jr. |
| 5,819,284 A | 10/1998 | Farber et al. |
| 5,822,324 A | 10/1998 | Kostresti et al. |
| 5,822,747 A | 10/1998 | Graefe et al. |
| 5,826,269 A | 10/1998 | Hussey |
| 5,831,664 A | 11/1998 | Wharton et al. |
| 5,832,483 A | 11/1998 | Barker |
| 5,832,489 A | 11/1998 | Kucala |
| 5,832,500 A | 11/1998 | Burrows |
| 5,835,087 A | 11/1998 | Herz et al. |
| 5,835,722 A | 11/1998 | Bradshaw et al. |
| 5,838,252 A | 11/1998 | Kikinis |
| 5,838,768 A | 11/1998 | Sumar et al. |
| 5,838,973 A | 11/1998 | Carpenter-Smith et al. |
| 5,845,278 A | 12/1998 | Kirsch et al. |
| 5,852,775 A | 12/1998 | Hidary |
| 5,852,820 A | 12/1998 | Burrows |
| 5,857,201 A | 1/1999 | Wright, Jr. et al. |
| 5,862,223 A | 1/1999 | Walker et al. |
| 5,867,665 A | 2/1999 | Butman et al. |
| 5,867,817 A | 2/1999 | Catallo et al. |
| 5,870,759 A | 2/1999 | Bauer et al. |
| 5,884,323 A | 3/1999 | Hawkins et al. |
| 5,889,845 A | 3/1999 | Staples et al. |
| 5,890,147 A | 3/1999 | Peltonen et al. |
| 5,892,909 A | 4/1999 | Grasso et al. |
| 5,898,780 A | 4/1999 | Liu et al. |
| 5,898,917 A | 4/1999 | Batni et al. |
| 5,903,723 A | 5/1999 | Beck et al. |
| 5,907,618 A | 5/1999 | Gennaro et al. |
| 5,909,689 A | 6/1999 | Van Ryzin |
| 5,913,032 A | 6/1999 | Schwartz et al. |
| 5,924,096 A | 7/1999 | Draper et al. |
| 5,928,325 A | 7/1999 | Shaughnessy et al. |
| 5,928,329 A | 7/1999 | Clark et al. |
| 5,937,161 A | 8/1999 | Mulligan et al. |
| 5,943,676 A | 8/1999 | Boothby |
| 5,948,066 A | 9/1999 | Whalen et al. |
| 5,951,636 A | 9/1999 | Zerber |
| 5,960,394 A | 9/1999 | Gould et al. |
| 5,960,406 A | 9/1999 | Rasansky et al. |
| 5,961,590 A | 10/1999 | Mendez et al. |
| 5,963,642 A | 10/1999 | Goldstein |
| 5,964,833 A | 10/1999 | Kikinis |
| 5,968,131 A | 10/1999 | Mendez et al. |
| 5,974,238 A | 10/1999 | Chase, Jr. |
| 5,974,327 A | 10/1999 | Agrawal et al. |
| 5,978,837 A | 11/1999 | Foladare et al. |
| 5,978,933 A | 11/1999 | Wyld et al. |
| 5,987,440 A | 11/1999 | O'Neil et al. |
| 6,000,000 A | 12/1999 | Hawkins et al. |
| 6,003,070 A | 12/1999 | Frantz |
| 6,006,274 A | 12/1999 | Hawkins et al. |
| 6,016,478 A | 1/2000 | Zhang et al. |
| 6,016,520 A | 1/2000 | Facq et al. |
| 6,018,762 A | 1/2000 | Brunson et al. |
| 6,023,700 A | 2/2000 | Owens et al. |
| 6,023,708 A | 2/2000 | Mendez et al. |
| 6,029,238 A | 2/2000 | Furukawa |
| 6,034,621 A | 3/2000 | Kaufman |
| 6,035,104 A | 3/2000 | Zahariev |
| 6,044,372 A | 3/2000 | Rothfus et al. |
| 6,044,381 A | 3/2000 | Boothby et al. |
| 6,047,051 A | 4/2000 | Ginzboorg et al. |
| 6,047,327 A | 4/2000 | Tso et al. |
| 6,052,563 A | 4/2000 | Macko |
| 6,052,735 A | 4/2000 | Ulrich et al. |
| 6,057,855 A | 5/2000 | Barkans |
| 6,065,055 A | 5/2000 | Hughes et al. |
| 6,073,138 A | 6/2000 | de l'Etraz et al. |
| 6,073,142 A | 6/2000 | Geiger et al. |

| Patent No. | Date | Inventor |
|---|---|---|
| 6,073,165 A | 6/2000 | Narasimhan et al. |
| 6,085,166 A | 7/2000 | Beckhardt et al. |
| 6,085,192 A | 7/2000 | Mendez et al. |
| 6,088,677 A | 7/2000 | Spurgeon |
| 6,101,320 A | 8/2000 | Schuetze et al. |
| 6,101,480 A | 8/2000 | Conmy et al. |
| 6,101,531 A | 8/2000 | Eggleston et al. |
| 6,112,181 A | 8/2000 | Shear et al. |
| 6,119,014 A | 9/2000 | Alperovich et al. |
| 6,119,171 A | 9/2000 | Alkhatib |
| 6,125,369 A | 9/2000 | Wu et al. |
| 6,125,388 A | 9/2000 | Reisman |
| 6,128,627 A | 10/2000 | Mattis et al. |
| 6,130,898 A | 10/2000 | Kostreski et al. |
| 6,131,096 A | 10/2000 | Ng et al. |
| 6,131,116 A | 10/2000 | Riggins et al. |
| 6,134,432 A | 10/2000 | Holmes et al. |
| 6,138,013 A | 10/2000 | Blanchard et al. |
| 6,138,124 A | 10/2000 | Beckhardt |
| 6,138,128 A | 10/2000 | Perkowitz et al. |
| 6,138,146 A | 10/2000 | Moon et al. |
| 6,141,664 A | 10/2000 | Boothby |
| 6,151,606 A | 11/2000 | Mendez |
| 6,157,630 A | 12/2000 | Adler et al. |
| 6,161,140 A | 12/2000 | Moriya |
| 6,167,379 A | 12/2000 | Dean et al. |
| 6,167,435 A | 12/2000 | Druckenmiller et al. |
| 6,170,014 B1 | 1/2001 | Darago et al. |
| 6,173,312 B1 | 1/2001 | Atarashi et al. |
| 6,173,446 B1 | 1/2001 | Khan et al. |
| 6,175,831 B1 | 1/2001 | Weinreich et al. |
| 6,178,419 B1 | 1/2001 | Legh-Smith et al. |
| 6,181,935 B1 | 1/2001 | Gossman et al. |
| 6,195,533 B1 | 2/2001 | Tkatch et al. |
| 6,198,696 B1 | 3/2001 | Korpi et al. |
| 6,198,922 B1 | 3/2001 | Baynham |
| 6,201,469 B1 | 3/2001 | Balch et al. |
| 6,202,085 B1 | 3/2001 | Benson et al. |
| 6,205,448 B1 | 3/2001 | Kruglikov et al. |
| 6,212,529 B1 | 4/2001 | Boothby et al. |
| 6,219,694 B1 | 4/2001 | Lazaridis et al. |
| 6,221,877 B1 | 4/2001 | Aronov et al. |
| 6,223,187 B1 | 4/2001 | Boothby et al. |
| 6,226,686 B1 | 5/2001 | Rothschild et al. |
| 6,233,341 B1 | 5/2001 | Riggins |
| 6,243,705 B1 | 6/2001 | Kucala |
| 6,246,875 B1 | 6/2001 | Seazholtz et al. |
| 6,247,135 B1 | 6/2001 | Feague |
| 6,249,808 B1 | 6/2001 | Seshadri |
| 6,256,666 B1 | 7/2001 | Singhal |
| 6,263,201 B1 | 7/2001 | Hashimoto et al. |
| 6,263,340 B1 | 7/2001 | Green |
| 6,269,369 B1 | 7/2001 | Robertson |
| 6,272,545 B1 | 8/2001 | Flanagin et al. |
| 6,275,850 B1 | 8/2001 | Beyda et al. |
| 6,289,212 B1 | 9/2001 | Stein et al. |
| 6,292,904 B1 | 9/2001 | Broomhall et al. |
| 6,295,541 B1 | 9/2001 | Bodnar et al. |
| 6,300,947 B1 | 10/2001 | Kanevsky |
| 6,304,881 B1 | 10/2001 | Halim et al. |
| 6,308,201 B1 | 10/2001 | Pivowar et al. |
| 6,317,594 B1 | 11/2001 | Gossman et al. |
| 6,320,943 B1 | 11/2001 | Borland |
| 6,324,541 B1 | 11/2001 | de l'Etraz et al. |
| 6,324,542 B1 | 11/2001 | Wright, Jr. et al. |
| 6,324,544 B1 | 11/2001 | Alam et al. |
| 6,324,587 B1 | 11/2001 | Trenbeath et al. |
| 6,327,586 B1 | 12/2001 | Kisiel |
| 6,336,117 B1 | 1/2002 | Massarani |
| 6,356,937 B1 | 3/2002 | Montville et al. |
| 6,363,352 B1 | 3/2002 | Dailey et al. |
| 6,370,566 B2 | 4/2002 | Discolo et al. |
| 6,377,810 B1 | 4/2002 | Geiger et al. |
| 6,380,959 B1 | 4/2002 | Wang et al. |
| 6,389,422 B1 | 5/2002 | Doi et al. |
| 6,389,455 B1 | 5/2002 | Fuisz |
| 6,389,457 B2 | 5/2002 | Lazaridis et al. |
| 6,397,057 B1 | 5/2002 | Malackowski et al. |
| 6,397,230 B1 | 5/2002 | Carmel et al. |
| 6,401,104 B1 | 6/2002 | LaRue et al. |
| 6,401,112 B1 | 6/2002 | Boyer et al. |
| 6,401,113 B2 | 6/2002 | Lazaridis et al. |
| 6,405,197 B2 | 6/2002 | Gilmour |
| 6,411,696 B1 | 6/2002 | Iverson et al. |
| 6,415,031 B1 | 7/2002 | Colligan et al. |
| 6,418,308 B1 | 7/2002 | Heinonen et al. |
| 6,421,669 B1 | 7/2002 | Gilmour et al. |
| 6,421,781 B1 | 7/2002 | Fox et al. |
| 6,430,602 B1 | 8/2002 | Kay et al. |
| 6,438,585 B2 | 8/2002 | Mousseau et al. |
| 6,438,612 B1 | 8/2002 | Ylonen et al. |
| 6,442,589 B1 | 8/2002 | Takahashi et al. |
| 6,442,637 B1 | 8/2002 | Hawkins et al. |
| 6,446,118 B1 | 9/2002 | Gottlieb |
| 6,463,463 B1 | 10/2002 | Godfrey et al. |
| 6,463,464 B1 | 10/2002 | Lazaridis et al. |
| 6,487,557 B1 | 11/2002 | Nagatomo |
| 6,487,560 B1 | 11/2002 | LaRue et al. |
| 6,490,353 B1 | 12/2002 | Tan |
| 6,496,802 B1 | 12/2002 | van Zoest et al. |
| 6,499,054 B1 | 12/2002 | Hesselink et al. |
| 6,505,214 B1 | 1/2003 | Sherman et al. |
| 6,516,327 B1 | 2/2003 | Zondervan et al. |
| 6,526,506 B1 | 2/2003 | Lewis |
| 6,529,908 B1 | 3/2003 | Piett et al. |
| 6,532,446 B1 | 3/2003 | King |
| 6,535,892 B1 | 3/2003 | LaRue et al. |
| 6,546,005 B1 | 4/2003 | Berkley et al. |
| 6,549,939 B1 | 4/2003 | Ford et al. |
| 6,556,217 B1 | 4/2003 | Makipaa et al. |
| 6,593,944 B1 | 7/2003 | Nicolas et al. |
| 6,601,026 B2 | 7/2003 | Appelt et al. |
| 6,615,253 B1 | 9/2003 | Bowman-Amuah |
| 6,618,710 B1 | 9/2003 | Zondervan et al. |
| 6,621,892 B1 | 9/2003 | Banister et al. |
| 6,625,621 B2 | 9/2003 | Tan et al. |
| 6,636,482 B2 | 10/2003 | Cloonan et al. |
| 6,639,693 B1 | 10/2003 | Ejiri et al. |
| 6,640,097 B2 | 10/2003 | Corrigan et al. |
| 6,640,244 B1 | 10/2003 | Bowman-Amuah |
| 6,640,249 B1 | 10/2003 | Bowman-Amuah |
| 6,643,650 B1 | 11/2003 | Slaughter et al. |
| 6,643,688 B1 | 11/2003 | Fuisz |
| 6,647,384 B2 | 11/2003 | Gilmour |
| 6,650,890 B1 | 11/2003 | Irlam et al. |
| 6,662,016 B1 | 12/2003 | Buckham et al. |
| 6,668,046 B1 | 12/2003 | Albal |
| 6,671,695 B2 | 12/2003 | McFadden |
| 6,671,700 B1 | 12/2003 | Creemer et al. |
| 6,671,702 B2 | 12/2003 | Kruglikov et al. |
| 6,671,757 B1 | 12/2003 | Multer et al. |
| 6,694,336 B1 | 2/2004 | Multer et al. |
| 6,697,807 B2 | 2/2004 | McGeachie |
| 6,701,378 B1 | 3/2004 | Gilhuly et al. |
| 6,707,801 B2 | 3/2004 | Hsu |
| 6,708,221 B1 | 3/2004 | Mendez et al. |
| 6,714,965 B2 | 3/2004 | Kakuta et al. |
| 6,721,787 B1 | 4/2004 | Hiscock |
| 6,727,917 B1 | 4/2004 | Chew et al. |
| 6,728,530 B1 | 4/2004 | Heinonen et al. |
| 6,728,786 B2 | 4/2004 | Hawkins et al. |
| 6,732,101 B1 | 5/2004 | Cook |
| 6,732,158 B1 | 5/2004 | Hesselink et al. |
| 6,735,591 B2 | 5/2004 | Khan |
| 6,741,232 B1 | 5/2004 | Siedlikowski et al. |
| 6,741,855 B1 | 5/2004 | Martin et al. |
| 6,742,015 B1 | 5/2004 | Bowman-Amuah |
| 6,745,024 B1 | 6/2004 | DeJaco et al. |
| 6,745,326 B1 | 6/2004 | Wary |
| 6,756,882 B2 | 6/2004 | Benes et al. |
| 6,757,362 B1 | 6/2004 | Cooper et al. |
| 6,757,696 B2 | 6/2004 | Multer et al. |
| 6,760,916 B2 | 7/2004 | Holtz et al. |
| 6,771,294 B1 | 8/2004 | Pulli et al. |
| 6,775,362 B1 | 8/2004 | Ransom |
| 6,779,019 B1 | 8/2004 | Mousseau et al. |
| 6,782,409 B1 | 8/2004 | Yoshida |
| 6,785,868 B1 | 8/2004 | Raff |

| | | |
|---|---|---|
| 6,785,906 B1 | 8/2004 | Gaughan et al. |
| 6,799,190 B1 | 9/2004 | Boothby |
| 6,804,707 B1 | 10/2004 | Ronning |
| 6,816,849 B1 | 11/2004 | Halt, Jr. |
| 6,820,088 B1 | 11/2004 | Hind et al. |
| 6,820,204 B1 | 11/2004 | Desai et al. |
| 6,829,487 B2 | 12/2004 | Eiden et al. |
| 6,834,195 B2 | 12/2004 | Brandenberg et al. |
| 6,847,974 B2 | 1/2005 | Wachtel |
| 6,850,757 B2 | 2/2005 | Watanabe et al. |
| 6,859,212 B2 | 2/2005 | Kumar et al. |
| 6,867,774 B1 | 3/2005 | Halmshaw et al. |
| 6,868,447 B1 | 3/2005 | Slaughter et al. |
| 6,871,220 B1 | 3/2005 | Rajan et al. |
| 6,871,236 B2 | 3/2005 | Fishman et al. |
| 6,873,688 B1 | 3/2005 | Aarnio |
| 6,874,017 B1 | 3/2005 | Inoue et al. |
| 6,879,985 B2 | 4/2005 | Deguchi et al. |
| 6,886,030 B1 | 4/2005 | Easterbrook et al. |
| 6,892,070 B2 | 5/2005 | Warrier et al. |
| 6,892,196 B1 | 5/2005 | Hughes |
| 6,895,394 B1 | 5/2005 | Kremer et al. |
| 6,895,558 B1 | 5/2005 | Loveland |
| 6,898,427 B1 | 5/2005 | Griffith et al. |
| 6,922,547 B2 | 7/2005 | O'Neill et al. |
| 6,922,721 B1 | 7/2005 | Minborg et al. |
| 6,925,477 B1 | 8/2005 | Champagne et al. |
| 6,931,529 B2 | 8/2005 | Kunzinger |
| 6,938,079 B1 | 8/2005 | Anderson et al. |
| 6,944,447 B2 | 9/2005 | Portman et al. |
| 6,944,662 B2 | 9/2005 | Devine et al. |
| 6,947,770 B2 | 9/2005 | Rydbeck |
| 6,957,397 B1 | 10/2005 | Hawkins et al. |
| 6,965,917 B1 | 11/2005 | Aloni et al. |
| 6,966,058 B2 | 11/2005 | Earl et al. |
| 6,968,175 B2 | 11/2005 | Raivisto et al. |
| 6,970,879 B1 | 11/2005 | Gilmour |
| 6,972,682 B2 | 12/2005 | Lareau et al. |
| 6,973,299 B2 | 12/2005 | Apfel |
| 6,981,041 B2 | 12/2005 | Araujo et al. |
| 6,981,047 B2 | 12/2005 | Hanson et al. |
| 6,985,983 B2 | 1/2006 | Pellegrino et al. |
| 6,986,061 B1 | 1/2006 | Kunzinger |
| 6,987,734 B2 | 1/2006 | Hundemer |
| 6,990,472 B2 | 1/2006 | Rosenhaft et al. |
| 6,993,326 B2 | 1/2006 | Link, II et al. |
| 6,993,327 B2 | 1/2006 | Mathis |
| 6,999,753 B2 | 2/2006 | Beckmann et al. |
| 7,020,685 B1 | 3/2006 | Chen et al. |
| 7,024,491 B1 | 4/2006 | Hanmann et al. |
| 7,026,984 B1 | 4/2006 | Thandu et al. |
| 7,032,242 B1 | 4/2006 | Grabelsky et al. |
| 7,035,630 B2 | 4/2006 | Knowles |
| 7,046,993 B2 | 5/2006 | Haaramo et al. |
| 7,047,202 B2 | 5/2006 | Jaipuria et al. |
| 7,062,024 B2 | 6/2006 | Kreckel et al. |
| 7,069,308 B2 | 6/2006 | Abrams |
| 7,072,678 B2 | 7/2006 | Allison |
| 7,079,499 B1 | 7/2006 | Akhtar et al. |
| 7,082,316 B2 | 7/2006 | Eiden et al. |
| 7,085,365 B2 | 8/2006 | Kauppinen |
| 7,096,030 B2 | 8/2006 | Huomo |
| 7,100,821 B2 | 9/2006 | Rasti |
| 7,103,432 B2 | 9/2006 | Drader et al. |
| 7,120,692 B2 | 10/2006 | Hesselink et al. |
| 7,120,928 B2 | 10/2006 | Sheth et al. |
| 7,130,839 B2 | 10/2006 | Boreham et al. |
| 7,136,645 B2 | 11/2006 | Hanson et al. |
| 7,139,555 B2 | 11/2006 | Apfel |
| 7,139,565 B2 | 11/2006 | Fiatal et al. |
| 7,140,549 B2 | 11/2006 | de Jong |
| 7,146,645 B1 | 12/2006 | Hellsten et al. |
| 7,149,780 B2 | 12/2006 | Quine et al. |
| 7,149,789 B2 | 12/2006 | Slivka et al. |
| 7,149,959 B1 | 12/2006 | Jones et al. |
| 7,162,241 B2 | 1/2007 | Kim et al. |
| 7,165,727 B2 | 1/2007 | de Jong |
| 7,172,118 B2 | 2/2007 | Urken |
| 7,181,228 B2 | 2/2007 | Boesch |
| 7,184,790 B2 | 2/2007 | Dorenbosch et al. |
| 7,185,362 B2 | 2/2007 | Hawkes et al. |
| 7,194,273 B2 | 3/2007 | Vaudreuil |
| 7,200,390 B1 | 4/2007 | Henager et al. |
| 7,203,733 B1 | 4/2007 | Bern |
| 7,206,806 B2 | 4/2007 | Pineau |
| 7,209,757 B2 | 4/2007 | Naghian et al. |
| 7,219,222 B1 | 5/2007 | Durbin et al. |
| 7,224,957 B2 | 5/2007 | Spector |
| 7,231,206 B2 | 6/2007 | Cudak et al. |
| 7,233,795 B1 | 6/2007 | Ryden |
| 7,234,111 B2 | 6/2007 | Chu et al. |
| 7,239,877 B2 | 7/2007 | Corneille et al. |
| 7,240,095 B1 | 7/2007 | Lewis |
| 7,242,680 B2 | 7/2007 | Gallant |
| 7,245,926 B2 | 7/2007 | Liao et al. |
| 7,257,391 B2 | 8/2007 | Burgess et al. |
| 7,257,639 B1 | 8/2007 | Li et al. |
| 7,259,666 B1 | 8/2007 | Hermsmeyer et al. |
| 7,260,552 B2 | 8/2007 | Riera Jorba et al. |
| 7,260,590 B1 | 8/2007 | Williams |
| 7,272,830 B2 | 9/2007 | de Jong |
| 7,277,408 B2 | 10/2007 | Sorsa |
| 7,289,792 B1 | 10/2007 | Turunen |
| 7,289,964 B2 | 10/2007 | Bowman-Amuah |
| 7,289,971 B1 | 10/2007 | O'Neil et al. |
| 7,293,107 B1 | 11/2007 | Hanson et al. |
| 7,295,853 B2 | 11/2007 | Jin et al. |
| 7,305,252 B2 | 12/2007 | Britt et al. |
| 7,305,700 B2 | 12/2007 | Boynton et al. |
| 7,310,350 B1 | 12/2007 | Shao et al. |
| 7,310,729 B2 | 12/2007 | Gordon et al. |
| 7,349,871 B2 | 3/2008 | Labrou et al. |
| 7,359,720 B2 | 4/2008 | Hartmaier et al. |
| 7,373,386 B2 | 5/2008 | Gardner et al. |
| 7,374,099 B2 | 5/2008 | de Jong |
| 7,376,701 B2 | 5/2008 | Bhargava et al. |
| 7,382,879 B1 | 6/2008 | Miller |
| 7,388,950 B2 | 6/2008 | Elsey et al. |
| 7,389,412 B2 | 6/2008 | Sharma et al. |
| 7,392,483 B2 | 6/2008 | Wong et al. |
| 7,395,329 B1 | 7/2008 | Holt et al. |
| 7,398,271 B1 | 7/2008 | Borkovsky et al. |
| 7,430,609 B2 | 9/2008 | Brown et al. |
| 7,441,271 B2 | 10/2008 | Fiatal et al. |
| 7,461,071 B2 | 12/2008 | Fitzpatrick et al. |
| 7,465,231 B2 | 12/2008 | Lewin et al. |
| 7,469,125 B2 | 12/2008 | Nurmi |
| 7,483,036 B2 | 1/2009 | Moore |
| 7,499,537 B2 | 3/2009 | Elsey et al. |
| 7,502,615 B2 | 3/2009 | Wilhoite et al. |
| 7,519,042 B2 | 4/2009 | Gorday et al. |
| 7,532,571 B1 | 5/2009 | Price et al. |
| 7,539,665 B2 | 5/2009 | Mendez |
| 7,548,947 B2 | 6/2009 | Kasriel et al. |
| 7,551,900 B2 | 6/2009 | Kang et al. |
| 7,567,575 B2 | 7/2009 | Chen et al. |
| 7,574,208 B2 | 8/2009 | Hanson et al. |
| 7,575,171 B2 | 8/2009 | Lev |
| 7,584,294 B2 | 9/2009 | Plamondon |
| 7,587,482 B2 | 9/2009 | Henderson et al. |
| 7,587,608 B2 | 9/2009 | Haller et al. |
| 7,593,714 B2 | 9/2009 | Schultz et al. |
| 7,596,608 B2 | 9/2009 | Alexander et al. |
| 7,613,792 B2 | 11/2009 | Zervas et al. |
| 7,643,818 B2 | 1/2010 | Backholm et al. |
| 7,644,166 B2 | 1/2010 | Appelman et al. |
| 7,672,439 B2 | 3/2010 | Appelman et al. |
| 7,680,281 B2 | 3/2010 | Fiatal et al. |
| 7,689,664 B2 | 3/2010 | Karlberg |
| 7,693,944 B2 | 4/2010 | Appelman et al. |
| 7,694,008 B2 | 4/2010 | Chang et al. |
| 7,706,781 B2 | 4/2010 | Backholm et al. |
| 7,752,633 B1 | 7/2010 | Fleming |
| 7,757,956 B2 | 7/2010 | Koenck et al. |
| 7,769,395 B2 | 8/2010 | Fiatal et al. |
| 7,769,400 B2 | 8/2010 | Backholm et al. |
| 7,769,805 B1 | 8/2010 | Barnes et al. |
| 7,783,757 B2 | 8/2010 | Plamondon |

| | | |
|---|---|---|
| 7,796,742 B1 | 9/2010 | Sutaria et al. |
| 7,797,064 B2 | 9/2010 | Loomis et al. |
| 7,809,818 B2 | 10/2010 | Plamondon |
| 7,827,055 B1 | 11/2010 | Snodgrass et al. |
| 7,827,597 B2 | 11/2010 | Boynton et al. |
| 7,853,563 B2 | 12/2010 | Alvarado et al. |
| 7,877,703 B1 | 1/2011 | Fleming |
| 7,899,996 B1 | 3/2011 | Levin-Michael |
| 7,917,505 B2 | 3/2011 | van Gent et al. |
| 7,921,167 B2 | 4/2011 | Shroff et al. |
| 7,937,091 B2 | 5/2011 | Roman et al. |
| 7,970,860 B2 | 6/2011 | Kline et al. |
| 7,996,487 B2 | 8/2011 | Snyder |
| 8,005,891 B2 | 8/2011 | Knowles et al. |
| 8,010,082 B2 | 8/2011 | Sutaria et al. |
| 8,064,583 B1 | 11/2011 | Sutaria et al. |
| 8,069,166 B2 | 11/2011 | Alvarado et al. |
| 8,078,158 B2 | 12/2011 | Backholm |
| 2001/0009025 A1 | 7/2001 | Ahonen |
| 2001/0010046 A1 | 7/2001 | Muyres et al. |
| 2001/0013069 A1 | 8/2001 | Shah |
| 2001/0023414 A1 | 9/2001 | Kumar et al. |
| 2001/0032254 A1 | 10/2001 | Hawkins |
| 2001/0034225 A1 | 10/2001 | Gupte et al. |
| 2001/0034244 A1 | 10/2001 | Calder et al. |
| 2001/0037453 A1 | 11/2001 | Mitty et al. |
| 2001/0039191 A1 | 11/2001 | Maierhofer |
| 2001/0041566 A1 | 11/2001 | Xanthos et al. |
| 2001/0042009 A1 | 11/2001 | Montague |
| 2001/0042099 A1 | 11/2001 | Peng |
| 2001/0043148 A1 | 11/2001 | Stewart |
| 2001/0053687 A1 | 12/2001 | Sivula |
| 2002/0002478 A1 | 1/2002 | Swart et al. |
| 2002/0002591 A1 | 1/2002 | Ketola |
| 2002/0007303 A1 | 1/2002 | Brookler et al. |
| 2002/0013727 A1 | 1/2002 | Lee |
| 2002/0019225 A1 | 2/2002 | Miyashita |
| 2002/0019812 A1 | 2/2002 | Board et al. |
| 2002/0035556 A1 | 3/2002 | Shah et al. |
| 2002/0035617 A1 | 3/2002 | Lynch et al. |
| 2002/0038253 A1 | 3/2002 | Seaman et al. |
| 2002/0042875 A1 | 4/2002 | Shukla |
| 2002/0049828 A1 | 4/2002 | Pekarek-Kostka |
| 2002/0053078 A1 | 5/2002 | Holtz et al. |
| 2002/0055351 A1 | 5/2002 | Elsey et al. |
| 2002/0059201 A1 | 5/2002 | Work |
| 2002/0059457 A1 | 5/2002 | Ballard et al. |
| 2002/0068559 A1 | 6/2002 | Sharma et al. |
| 2002/0073207 A1 | 6/2002 | Widger et al. |
| 2002/0077077 A1 | 6/2002 | Rezvani et al. |
| 2002/0077084 A1 | 6/2002 | Zellner et al. |
| 2002/0078384 A1 | 6/2002 | Hippelainen |
| 2002/0087549 A1 | 7/2002 | Mostafa |
| 2002/0087679 A1 | 7/2002 | Pulley et al. |
| 2002/0089542 A1 | 7/2002 | Imamura |
| 2002/0091921 A1 | 7/2002 | Kunzinger |
| 2002/0095319 A1 | 7/2002 | Swart et al. |
| 2002/0095328 A1 | 7/2002 | Swart et al. |
| 2002/0095391 A1 | 7/2002 | Swart et al. |
| 2002/0095399 A1 | 7/2002 | Devine et al. |
| 2002/0098855 A1 | 7/2002 | Hartmaier et al. |
| 2002/0099613 A1 | 7/2002 | Swart et al. |
| 2002/0099809 A1 | 7/2002 | Lee |
| 2002/0101975 A1 | 8/2002 | Tiburtius et al. |
| 2002/0107985 A1 | 8/2002 | Hwang et al. |
| 2002/0116499 A1 | 8/2002 | Enns et al. |
| 2002/0116501 A1 | 8/2002 | Ho et al. |
| 2002/0120766 A1 | 8/2002 | Okajima et al. |
| 2002/0120779 A1 | 8/2002 | Teeple et al. |
| 2002/0126701 A1 | 9/2002 | Requena |
| 2002/0133504 A1 | 9/2002 | Vlahos et al. |
| 2002/0144109 A1 | 10/2002 | Benantar et al. |
| 2002/0146129 A1 | 10/2002 | Kaplan |
| 2002/0152379 A1 | 10/2002 | Gefwert et al. |
| 2002/0155848 A1 | 10/2002 | Suryanarayana |
| 2002/0156839 A1 | 10/2002 | Peterson et al. |
| 2002/0158908 A1 | 10/2002 | Vaajala et al. |
| 2002/0161587 A1 | 10/2002 | Pitts et al. |
| 2002/0161925 A1 | 10/2002 | Munger et al. |
| 2002/0161928 A1 | 10/2002 | Ndili |
| 2002/0164977 A1 | 11/2002 | Link, II et al. |
| 2002/0167484 A1 | 11/2002 | Hatanaka et al. |
| 2002/0174189 A1 | 11/2002 | Peng |
| 2002/0186848 A1 | 12/2002 | Shaik |
| 2002/0188940 A1 | 12/2002 | Breckner et al. |
| 2002/0193094 A1 | 12/2002 | Lawless et al. |
| 2002/0194209 A1 | 12/2002 | Bolosky et al. |
| 2002/0198027 A1 | 12/2002 | Rydbeck |
| 2003/0005151 A1 | 1/2003 | Ullman et al. |
| 2003/0022662 A1 | 1/2003 | Mittal |
| 2003/0023692 A1 | 1/2003 | Moroo |
| 2003/0023975 A1 | 1/2003 | Schrader et al. |
| 2003/0028430 A1 | 2/2003 | Zimmerman |
| 2003/0028441 A1 | 2/2003 | Barsness et al. |
| 2003/0050041 A1 | 3/2003 | Wu |
| 2003/0054810 A1 | 3/2003 | Chen et al. |
| 2003/0056096 A1 | 3/2003 | Albert et al. |
| 2003/0060188 A1 | 3/2003 | Gidron et al. |
| 2003/0063120 A1 | 4/2003 | Wong et al. |
| 2003/0065738 A1 | 4/2003 | Yang et al. |
| 2003/0065739 A1 | 4/2003 | Shnier |
| 2003/0065802 A1 | 4/2003 | Vitikainen et al. |
| 2003/0070061 A1 | 4/2003 | Wong et al. |
| 2003/0072451 A1 | 4/2003 | Pimentel et al. |
| 2003/0078880 A1 | 4/2003 | Alley et al. |
| 2003/0084165 A1 | 5/2003 | Kjellberg et al. |
| 2003/0088629 A1 | 5/2003 | Berkowitz et al. |
| 2003/0093691 A1 | 5/2003 | Simon et al. |
| 2003/0097381 A1 | 5/2003 | Detweiler et al. |
| 2003/0100321 A1 | 5/2003 | Rao et al. |
| 2003/0100326 A1 | 5/2003 | Grube et al. |
| 2003/0117432 A1 | 6/2003 | Kautto-Kiovula et al. |
| 2003/0120685 A1 | 6/2003 | Duncombe et al. |
| 2003/0125023 A1 | 7/2003 | Fishler |
| 2003/0126216 A1 | 7/2003 | Avila et al. |
| 2003/0130984 A1 | 7/2003 | Quinlan et al. |
| 2003/0146934 A1 | 8/2003 | Bailey et al. |
| 2003/0153338 A1 | 8/2003 | Herz et al. |
| 2003/0154212 A1 | 8/2003 | Schirmer et al. |
| 2003/0156146 A1 | 8/2003 | Suomela et al. |
| 2003/0157947 A1 | 8/2003 | Fiatal et al. |
| 2003/0169262 A1 | 9/2003 | Lavelle et al. |
| 2003/0177281 A1 | 9/2003 | McQuillan et al. |
| 2003/0182431 A1 | 9/2003 | Sturniolo et al. |
| 2003/0187984 A1 | 10/2003 | Banavar et al. |
| 2003/0208529 A1 | 11/2003 | Pendyala et al. |
| 2003/0208559 A1 | 11/2003 | Velline et al. |
| 2003/0210666 A1 | 11/2003 | Trossen et al. |
| 2003/0211845 A1 | 11/2003 | Lohtia et al. |
| 2003/0217098 A1 | 11/2003 | Bobde et al. |
| 2003/0217142 A1 | 11/2003 | Bobde et al. |
| 2003/0223554 A1 | 12/2003 | Zhang |
| 2003/0227745 A1 | 12/2003 | Khoo |
| 2003/0235308 A1 | 12/2003 | Boynton et al. |
| 2003/0236981 A1 | 12/2003 | Marmigere et al. |
| 2004/0002324 A1 | 1/2004 | Juntunen et al. |
| 2004/0006630 A1 | 1/2004 | Friend et al. |
| 2004/0024795 A1 | 2/2004 | Hind et al. |
| 2004/0024892 A1 | 2/2004 | Creswell et al. |
| 2004/0027326 A1 | 2/2004 | Hays et al. |
| 2004/0027375 A1 | 2/2004 | Ellis et al. |
| 2004/0027378 A1 | 2/2004 | Hays et al. |
| 2004/0043770 A1 | 3/2004 | Amit et al. |
| 2004/0049599 A1 | 3/2004 | Friend et al. |
| 2004/0051715 A1 | 3/2004 | Brokenshire et al. |
| 2004/0054739 A1 | 3/2004 | Friend et al. |
| 2004/0064445 A1 | 4/2004 | Pfleging et al. |
| 2004/0064488 A1 | 4/2004 | Sinha |
| 2004/0068579 A1 | 4/2004 | Marmigere et al. |
| 2004/0068698 A1 | 4/2004 | Wu et al. |
| 2004/0073476 A1 | 4/2004 | Donahue et al. |
| 2004/0073651 A1 | 4/2004 | Beaulieu et al. |
| 2004/0075675 A1 | 4/2004 | Raivisto et al. |
| 2004/0075695 A1 | 4/2004 | Chew et al. |
| 2004/0078814 A1 | 4/2004 | Allen |
| 2004/0080515 A1 | 4/2004 | Hagiwara |
| 2004/0082346 A1 | 4/2004 | Skytt et al. |
| 2004/0098625 A1 | 5/2004 | Lagadec et al. |

| | | |
|---|---|---|
| 2004/0103147 A1 | 5/2004 | Flesher et al. |
| 2004/0120323 A1 | 6/2004 | Viikari et al. |
| 2004/0123304 A1* | 6/2004 | Black et al. .................. 719/318 |
| 2004/0128375 A1 | 7/2004 | Rockwell |
| 2004/0133626 A1 | 7/2004 | Herrero et al. |
| 2004/0141011 A1 | 7/2004 | Smethers et al. |
| 2004/0147248 A1 | 7/2004 | Will |
| 2004/0147262 A1 | 7/2004 | Lescuyer et al. |
| 2004/0158611 A1 | 8/2004 | Daniell et al. |
| 2004/0167966 A1 | 8/2004 | Lee et al. |
| 2004/0170257 A1 | 9/2004 | Gross et al. |
| 2004/0172481 A1 | 9/2004 | Engstrom |
| 2004/0176128 A1 | 9/2004 | Grabelsky et al. |
| 2004/0177369 A1 | 9/2004 | Akins |
| 2004/0179513 A1 | 9/2004 | Smith et al. |
| 2004/0181550 A1 | 9/2004 | Warsta et al. |
| 2004/0186902 A1 | 9/2004 | Stewart |
| 2004/0189610 A1 | 9/2004 | Friend |
| 2004/0199497 A1 | 10/2004 | Timmons |
| 2004/0199582 A1 | 10/2004 | Kucharewski et al. |
| 2004/0199663 A1 | 10/2004 | Horvitz et al. |
| 2004/0205248 A1 | 10/2004 | Little et al. |
| 2004/0205330 A1 | 10/2004 | Godfrey et al. |
| 2004/0209602 A1 | 10/2004 | Joyce et al. |
| 2004/0210639 A1 | 10/2004 | Ben-Yoseph et al. |
| 2004/0230619 A1 | 11/2004 | Blanco et al. |
| 2004/0233930 A1 | 11/2004 | Colby |
| 2004/0236792 A1 | 11/2004 | Celik |
| 2004/0252816 A1 | 12/2004 | Nicolas |
| 2004/0255126 A1 | 12/2004 | Reith |
| 2004/0258231 A1 | 12/2004 | Elsey et al. |
| 2004/0259535 A1 | 12/2004 | Elsey et al. |
| 2004/0259537 A1 | 12/2004 | Ackley |
| 2004/0266364 A1 | 12/2004 | Nguyen et al. |
| 2004/0268148 A1 | 12/2004 | Karjala et al. |
| 2005/0002501 A1 | 1/2005 | Elsey et al. |
| 2005/0002508 A1 | 1/2005 | Elsey et al. |
| 2005/0002509 A1 | 1/2005 | Elsey et al. |
| 2005/0002510 A1 | 1/2005 | Elsey et al. |
| 2005/0010694 A1 | 1/2005 | Ma et al. |
| 2005/0015432 A1 | 1/2005 | Cohen |
| 2005/0021750 A1 | 1/2005 | Abrams |
| 2005/0022182 A1 | 1/2005 | Mittal |
| 2005/0027591 A9 | 2/2005 | Gailey et al. |
| 2005/0027716 A1 | 2/2005 | Apfel |
| 2005/0033812 A1 | 2/2005 | McCarthy et al. |
| 2005/0037741 A1 | 2/2005 | Gilbert |
| 2005/0038707 A1 | 2/2005 | Roever et al. |
| 2005/0038724 A1 | 2/2005 | Roever et al. |
| 2005/0038863 A1 | 2/2005 | Onyon et al. |
| 2005/0041793 A1 | 2/2005 | Fulton et al. |
| 2005/0044144 A1 | 2/2005 | Malik et al. |
| 2005/0055578 A1 | 3/2005 | Wright et al. |
| 2005/0063544 A1 | 3/2005 | Uusitalo et al. |
| 2005/0071674 A1 | 3/2005 | Chou et al. |
| 2005/0073982 A1 | 4/2005 | Corneille et al. |
| 2005/0076136 A1 | 4/2005 | Cho et al. |
| 2005/0076241 A1 | 4/2005 | Appelman |
| 2005/0086540 A1 | 4/2005 | Gunter et al. |
| 2005/0094625 A1 | 5/2005 | Bouat |
| 2005/0097225 A1 | 5/2005 | Glatt et al. |
| 2005/0097570 A1 | 5/2005 | Bomers |
| 2005/0101307 A1 | 5/2005 | Brugge et al. |
| 2005/0102257 A1 | 5/2005 | Onyon et al. |
| 2005/0102328 A1 | 5/2005 | Ring et al. |
| 2005/0102351 A1 | 5/2005 | Jiang et al. |
| 2005/0108427 A1 | 5/2005 | Datta |
| 2005/0117606 A1 | 6/2005 | Kim |
| 2005/0120082 A1 | 6/2005 | Hesselink et al. |
| 2005/0120084 A1 | 6/2005 | Hu et al. |
| 2005/0122333 A1 | 6/2005 | Sumanaweera et al. |
| 2005/0124332 A1 | 6/2005 | Clark et al. |
| 2005/0138111 A1 | 6/2005 | Aton et al. |
| 2005/0144219 A1 | 6/2005 | Terada |
| 2005/0154698 A1 | 7/2005 | Ikezawa et al. |
| 2005/0154796 A1 | 7/2005 | Forsyth |
| 2005/0154836 A1 | 7/2005 | Steely et al. |
| 2005/0155027 A1 | 7/2005 | Wei |
| 2005/0164721 A1 | 7/2005 | Eric Yeh et al. |
| 2005/0165909 A1 | 7/2005 | Cromer et al. |
| 2005/0183143 A1 | 8/2005 | Anderholm et al. |
| 2005/0188038 A1 | 8/2005 | Yabe |
| 2005/0193036 A1 | 9/2005 | Phillips et al. |
| 2005/0193096 A1 | 9/2005 | Yu et al. |
| 2005/0203966 A1 | 9/2005 | Labrou et al. |
| 2005/0210104 A1 | 9/2005 | Torvinen |
| 2005/0210125 A1 | 9/2005 | Li |
| 2005/0228812 A1 | 10/2005 | Hansmann et al. |
| 2005/0232295 A1 | 10/2005 | Young |
| 2005/0234860 A1 | 10/2005 | Roever et al. |
| 2005/0235214 A1 | 10/2005 | Shimizu et al. |
| 2005/0246139 A1 | 11/2005 | Rivenbark et al. |
| 2005/0248526 A1 | 11/2005 | Twerdahl et al. |
| 2005/0251555 A1 | 11/2005 | Little |
| 2005/0254443 A1 | 11/2005 | Campbell et al. |
| 2005/0262220 A1 | 11/2005 | Ecklund et al. |
| 2005/0273804 A1 | 12/2005 | Preisman |
| 2005/0278307 A1 | 12/2005 | Battagin et al. |
| 2005/0278641 A1 | 12/2005 | Mansour et al. |
| 2005/0278647 A1 | 12/2005 | Leavitt et al. |
| 2005/0288006 A1 | 12/2005 | Apfel |
| 2006/0012672 A1 | 1/2006 | Schrader et al. |
| 2006/0020525 A1 | 1/2006 | Borelli et al. |
| 2006/0020580 A1 | 1/2006 | Dettinger et al. |
| 2006/0020804 A1 | 1/2006 | Schleifer et al. |
| 2006/0020947 A1 | 1/2006 | Hallamaa et al. |
| 2006/0021023 A1 | 1/2006 | Stewart et al. |
| 2006/0022048 A1 | 2/2006 | Johnson |
| 2006/0026580 A1 | 2/2006 | Cabillic et al. |
| 2006/0029062 A1 | 2/2006 | Rao et al. |
| 2006/0029063 A1 | 2/2006 | Rao et al. |
| 2006/0029064 A1 | 2/2006 | Rao et al. |
| 2006/0031114 A1 | 2/2006 | Zommers |
| 2006/0031365 A1 | 2/2006 | Kay et al. |
| 2006/0031428 A1 | 2/2006 | Wikman |
| 2006/0031785 A1 | 2/2006 | Raciborski |
| 2006/0037071 A1 | 2/2006 | Rao et al. |
| 2006/0046686 A1 | 3/2006 | Hawkins et al. |
| 2006/0047844 A1 | 3/2006 | Deng |
| 2006/0048061 A1 | 3/2006 | Forlenza et al. |
| 2006/0052091 A1 | 3/2006 | Onyon et al. |
| 2006/0059495 A1 | 3/2006 | Spector |
| 2006/0063544 A1 | 3/2006 | Zhao et al. |
| 2006/0069686 A1 | 3/2006 | Beyda et al. |
| 2006/0069687 A1 | 3/2006 | Cui et al. |
| 2006/0069742 A1 | 3/2006 | Segre |
| 2006/0073810 A1 | 4/2006 | Pyhalammi et al. |
| 2006/0074951 A1 | 4/2006 | Beier et al. |
| 2006/0075028 A1 | 4/2006 | Zager et al. |
| 2006/0084410 A1 | 4/2006 | Sutaria et al. |
| 2006/0085503 A1 | 4/2006 | Stoye et al. |
| 2006/0093135 A1 | 5/2006 | Fiatal et al. |
| 2006/0099969 A1 | 5/2006 | Staton et al. |
| 2006/0112177 A1 | 5/2006 | Barkley et al. |
| 2006/0123042 A1 | 6/2006 | Xie et al. |
| 2006/0132495 A1 | 6/2006 | Anderson |
| 2006/0141962 A1 | 6/2006 | Forbes et al. |
| 2006/0143464 A1 | 6/2006 | Ananthanarayanan et al. |
| 2006/0149591 A1 | 7/2006 | Hanf et al. |
| 2006/0149843 A1 | 7/2006 | Rhoads et al. |
| 2006/0149970 A1 | 7/2006 | Imazu |
| 2006/0165226 A1 | 7/2006 | Ernst et al. |
| 2006/0168043 A1 | 7/2006 | Eisenberger et al. |
| 2006/0168164 A1 | 7/2006 | Lemson et al. |
| 2006/0179410 A1 | 8/2006 | Deeds |
| 2006/0188864 A1 | 8/2006 | Shah |
| 2006/0190428 A1 | 8/2006 | Jung et al. |
| 2006/0190984 A1 | 8/2006 | Heard et al. |
| 2006/0192014 A1 | 8/2006 | Hamilton et al. |
| 2006/0195570 A1 | 8/2006 | Zellner et al. |
| 2006/0209842 A1 | 9/2006 | Creamer et al. |
| 2006/0212531 A1 | 9/2006 | Kikkawa et al. |
| 2006/0224629 A1 | 10/2006 | Alexander et al. |
| 2006/0230394 A1 | 10/2006 | Forth et al. |
| 2006/0240804 A1 | 10/2006 | Backholm et al. |
| 2006/0240805 A1 | 10/2006 | Backholm et al. |
| 2006/0242210 A1 | 10/2006 | Ring et al. |
| 2006/0242320 A1 | 10/2006 | Nettle et al. |

| | | |
|---|---|---|
| 2006/0242607 A1 | 10/2006 | Hudson |
| 2006/0252435 A1 | 11/2006 | Henderson et al. |
| 2006/0253456 A1 | 11/2006 | Pacholec et al. |
| 2006/0259923 A1 | 11/2006 | Chiu |
| 2006/0265595 A1 | 11/2006 | Scottodiluzio |
| 2006/0271884 A1 | 11/2006 | Hurst |
| 2006/0277265 A1 | 12/2006 | Backholm et al. |
| 2006/0277271 A1 | 12/2006 | Morse et al. |
| 2006/0294071 A1 | 12/2006 | Weare et al. |
| 2006/0294223 A1 | 12/2006 | Glasgow et al. |
| 2007/0005738 A1 | 1/2007 | Alexion-Tiernan et al. |
| 2007/0011367 A1 | 1/2007 | Scott et al. |
| 2007/0019610 A1 | 1/2007 | Backholm et al. |
| 2007/0022118 A1 | 1/2007 | Layne |
| 2007/0027775 A1 | 2/2007 | Hwang |
| 2007/0027832 A1 | 2/2007 | Fiatal et al. |
| 2007/0027886 A1 | 2/2007 | Gent et al. |
| 2007/0027917 A1 | 2/2007 | Ariel et al. |
| 2007/0027920 A1 | 2/2007 | Alvarado et al. |
| 2007/0027921 A1 | 2/2007 | Alvarado et al. |
| 2007/0027930 A1 | 2/2007 | Alvarado et al. |
| 2007/0033531 A1 | 2/2007 | Marsh |
| 2007/0038567 A1 | 2/2007 | Allaire et al. |
| 2007/0038931 A1 | 2/2007 | Allaire et al. |
| 2007/0044041 A1 | 2/2007 | Beynon et al. |
| 2007/0049258 A1 | 3/2007 | Thibeault |
| 2007/0060196 A1 | 3/2007 | Sharma |
| 2007/0061393 A1 | 3/2007 | Moore |
| 2007/0067381 A1 | 3/2007 | Grant et al. |
| 2007/0067424 A1 | 3/2007 | Raciborski et al. |
| 2007/0078857 A1 | 4/2007 | Punaganti et al. |
| 2007/0078964 A1 | 4/2007 | East et al. |
| 2007/0088852 A1 | 4/2007 | Levkovitz |
| 2007/0105627 A1 | 5/2007 | Campbell |
| 2007/0116223 A1 | 5/2007 | Burke et al. |
| 2007/0118620 A1 | 5/2007 | Cartmell et al. |
| 2007/0130108 A1 | 6/2007 | Simpson et al. |
| 2007/0130217 A1 | 6/2007 | Linyard et al. |
| 2007/0156824 A1 | 7/2007 | Thompson |
| 2007/0156842 A1 | 7/2007 | Vermeulen et al. |
| 2007/0162514 A1 | 7/2007 | Civetta et al. |
| 2007/0167178 A1 | 7/2007 | Al-Harbi |
| 2007/0174433 A1 | 7/2007 | Mendez et al. |
| 2007/0175998 A1 | 8/2007 | Lev |
| 2007/0198698 A1 | 8/2007 | Boyd et al. |
| 2007/0220080 A1 | 9/2007 | Humphrey |
| 2007/0245010 A1 | 10/2007 | Arn et al. |
| 2007/0249365 A1 | 10/2007 | Jendbro |
| 2007/0250591 A1 | 10/2007 | Milic-Frayling et al. |
| 2007/0264993 A1 | 11/2007 | Hughes |
| 2007/0267492 A1 | 11/2007 | Maclaine Pont |
| 2007/0276925 A1 | 11/2007 | La Joie et al. |
| 2007/0276926 A1 | 11/2007 | LaJoie et al. |
| 2007/0288469 A1 | 12/2007 | Shenfield |
| 2007/0290787 A1 | 12/2007 | Fiatal et al. |
| 2007/0293207 A1 | 12/2007 | Guedalia et al. |
| 2007/0293238 A1 | 12/2007 | Fiatal et al. |
| 2007/0294295 A1 | 12/2007 | Finkelstein et al. |
| 2007/0294763 A1 | 12/2007 | Udezue et al. |
| 2008/0001717 A1 | 1/2008 | Fiatal |
| 2008/0008095 A1 | 1/2008 | Gilfix |
| 2008/0009344 A1 | 1/2008 | Graham et al. |
| 2008/0032718 A1 | 2/2008 | Suresh |
| 2008/0037787 A1 | 2/2008 | Boynton et al. |
| 2008/0059308 A1 | 3/2008 | Gerken |
| 2008/0059398 A1 | 3/2008 | Tsutsui |
| 2008/0061142 A1 | 3/2008 | Howcroft et al. |
| 2008/0077506 A1 | 3/2008 | Rampell et al. |
| 2008/0077571 A1 | 3/2008 | Harris et al. |
| 2008/0085724 A1 | 4/2008 | Cormier et al. |
| 2008/0086379 A1 | 4/2008 | Dion et al. |
| 2008/0103877 A1 | 5/2008 | Gerken |
| 2008/0114881 A1 | 5/2008 | Lee et al. |
| 2008/0125225 A1 | 5/2008 | Lazaridis |
| 2008/0130663 A1 | 6/2008 | Fridman et al. |
| 2008/0133326 A1 | 6/2008 | Goncalves et al. |
| 2008/0133641 A1 | 6/2008 | Gent et al. |
| 2008/0133708 A1 | 6/2008 | Alvarado et al. |
| 2008/0134292 A1 | 6/2008 | Ariel et al. |
| 2008/0140665 A1 | 6/2008 | Ariel et al. |
| 2008/0151817 A1 | 6/2008 | Fitchett et al. |
| 2008/0154870 A1 | 6/2008 | Evermann et al. |
| 2008/0155613 A1 | 6/2008 | Benya et al. |
| 2008/0168145 A1 | 7/2008 | Wilson |
| 2008/0192820 A1 | 8/2008 | Brooks et al. |
| 2008/0198995 A1 | 8/2008 | McGary et al. |
| 2008/0201362 A1 | 8/2008 | Multer et al. |
| 2008/0201751 A1 | 8/2008 | Ahmed et al. |
| 2008/0207182 A1 | 8/2008 | Maharajh et al. |
| 2008/0209491 A1 | 8/2008 | Hasek |
| 2008/0214148 A1 | 9/2008 | Ramer et al. |
| 2008/0216094 A1* | 9/2008 | Anderson et al. ............ 719/318 |
| 2008/0233983 A1 | 9/2008 | Park et al. |
| 2008/0270379 A1 | 10/2008 | Ramakrishna |
| 2008/0273498 A1 | 11/2008 | Jalil et al. |
| 2008/0298386 A1 | 12/2008 | Fiatal |
| 2008/0299956 A1 | 12/2008 | Bailey et al. |
| 2008/0301300 A1 | 12/2008 | Toub |
| 2008/0313282 A1* | 12/2008 | Warila et al. .................. 709/206 |
| 2009/0012841 A1 | 1/2009 | Saft et al. |
| 2009/0016526 A1 | 1/2009 | Fiatal et al. |
| 2009/0019485 A1 | 1/2009 | Ellis et al. |
| 2009/0019532 A1 | 1/2009 | Jacobsen et al. |
| 2009/0031006 A1 | 1/2009 | Johnson |
| 2009/0054034 A1 | 2/2009 | Backholm et al. |
| 2009/0055353 A1 | 2/2009 | Meema |
| 2009/0063647 A1 | 3/2009 | Backholm et al. |
| 2009/0075683 A1 | 3/2009 | Backholm et al. |
| 2009/0077263 A1 | 3/2009 | Koganti et al. |
| 2009/0110179 A1 | 4/2009 | Elsey et al. |
| 2009/0119266 A1 | 5/2009 | Fitzpatrick et al. |
| 2009/0125523 A1 | 5/2009 | Fitzpatrick et al. |
| 2009/0144632 A1 | 6/2009 | Mendez |
| 2009/0147008 A1 | 6/2009 | Do et al. |
| 2009/0149203 A1 | 6/2009 | Backholm et al. |
| 2009/0156178 A1 | 6/2009 | Elsey et al. |
| 2009/0157792 A1 | 6/2009 | Fiatal |
| 2009/0164433 A1 | 6/2009 | R. et al. |
| 2009/0164560 A1 | 6/2009 | Fiatal |
| 2009/0172565 A1 | 7/2009 | Jackson et al. |
| 2009/0181641 A1 | 7/2009 | Fiatal |
| 2009/0182500 A1 | 7/2009 | Dicke |
| 2009/0187939 A1 | 7/2009 | Lajoie |
| 2009/0191903 A1 | 7/2009 | Fiatal |
| 2009/0193130 A1 | 7/2009 | Fiatal |
| 2009/0193338 A1 | 7/2009 | Fiatal |
| 2009/0221326 A1 | 9/2009 | Roussel et al. |
| 2009/0241180 A1 | 9/2009 | Fiatal |
| 2009/0248670 A1 | 10/2009 | Fiatal |
| 2009/0248696 A1 | 10/2009 | Rowles et al. |
| 2009/0248794 A1 | 10/2009 | Helms et al. |
| 2009/0264138 A1 | 10/2009 | Kang et al. |
| 2009/0282125 A1 | 11/2009 | Jeide et al. |
| 2009/0287750 A1 | 11/2009 | Banavar et al. |
| 2009/0299817 A1 | 12/2009 | Fok et al. |
| 2009/0307133 A1 | 12/2009 | Holloway et al. |
| 2009/0318171 A1 | 12/2009 | Backholm et al. |
| 2009/0323678 A1 | 12/2009 | Wang |
| 2009/0325565 A1 | 12/2009 | Backholm |
| 2010/0057924 A1 | 3/2010 | Rauber et al. |
| 2010/0077083 A1 | 3/2010 | Tran et al. |
| 2010/0087167 A1 | 4/2010 | Tsurutome et al. |
| 2010/0131617 A1 | 5/2010 | Osborne et al. |
| 2010/0146107 A1 | 6/2010 | Fiatal |
| 2010/0174735 A1 | 7/2010 | Fiatal |
| 2010/0279662 A1 | 11/2010 | Kuusinen et al. |
| 2010/0319054 A1 | 12/2010 | Mehta et al. |
| 2011/0040718 A1 | 2/2011 | Tendjoukian et al. |
| 2011/0065424 A1 | 3/2011 | Estevez et al. |
| 2011/0138402 A1 | 6/2011 | Fleming |
| 2011/0165889 A1 | 7/2011 | Fiatal et al. |
| 2011/0179138 A1 | 7/2011 | Van Geest et al. |
| 2011/0179377 A1 | 7/2011 | Fleming |
| 2011/0190014 A1 | 8/2011 | Fiatal |
| 2011/0191474 A1 | 8/2011 | Fiatal |
| 2011/0201304 A1 | 8/2011 | Sutaria et al. |
| 2011/0207436 A1 | 8/2011 | van Gent et al. |
| 2011/0213800 A1 | 9/2011 | Saros et al. |

| | | | |
|---|---|---|---|
| 2011/0213898 A1 | 9/2011 | Fiatal et al. | |
| 2011/0238772 A1 | 9/2011 | Fiatal | |
| 2011/0246950 A1 | 10/2011 | Luna et al. | |
| 2011/0252088 A1 | 10/2011 | Fiatal | |
| 2011/0264622 A1 | 10/2011 | Vargas et al. | |
| 2011/0264731 A1 | 10/2011 | Knowles et al. | |
| 2011/0294463 A1 | 12/2011 | Fiatal | |
| 2011/0294464 A1 | 12/2011 | Fiatal | |
| 2011/0302154 A1 | 12/2011 | Snyder | |
| 2012/0023190 A1 | 1/2012 | Backholm et al. | |
| 2012/0023226 A1 | 1/2012 | Petersen et al. | |
| 2012/0023236 A1 | 1/2012 | Backholm et al. | |

FOREIGN PATENT DOCUMENTS

| | | | |
|---|---|---|---|
| EP | 1278390 A1 | 1/2003 | |
| EP | 1422899 A1 | 5/2004 | |
| EP | 1466261 A1 | 10/2004 | |
| EP | 1466435 A1 | 10/2004 | |
| EP | 1482702 A1 | 12/2004 | |
| EP | 1815634 A1 | 8/2007 | |
| EP | 1815652 A1 | 8/2007 | |
| EP | 1817883 A1 | 8/2007 | |
| FI | 117152 B1 | 6/2006 | |
| FI | 118288 B1 | 9/2007 | |
| FI | 119581 B1 | 12/2008 | |
| JP | 4154233 A | 5/1992 | |
| JP | 10-336372 A | 12/1998 | |
| JP | 2001-218185 A | 8/2001 | |
| JP | 2001-350718 A | 12/2001 | |
| JP | 2001-356973 A | 12/2001 | |
| JP | 2005-515664 A | 5/2005 | |
| JP | 4386732 | 5/2005 | |
| JP | 2009-207177 A | 9/2009 | |
| KR | 2001-0018568 A | 3/2001 | |
| KR | 2007-0071858 A | 7/2007 | |
| KR | 2009-0077515 A | 7/2009 | |
| WO | WO-97/41661 A2 | 11/1997 | |
| WO | WO-98/24257 A1 | 6/1998 | |
| WO | WO-98/58322 A2 | 12/1998 | |
| WO | WO-01/30130 A2 | 5/2001 | |
| WO | WO-03/007570 A1 | 1/2003 | |
| WO | WO-03/058483 A1 | 7/2003 | |
| WO | WO-03/058879 A1 | 7/2003 | |
| WO | WO-03/065701 A1 | 8/2003 | |
| WO | WO-03/098890 A1 | 11/2003 | |
| WO | WO-2004/017591 A2 | 2/2004 | |
| WO | WO-2004045171 A1 | 5/2004 | |
| WO | WO-2005/015925 A2 | 2/2005 | |
| WO | WO-2005/020108 A1 | 3/2005 | |
| WO | WO-2006/045005 A2 | 4/2006 | |
| WO | WO-2006/045102 A2 | 4/2006 | |
| WO | WO-2006/053952 A1 | 5/2006 | |
| WO | WO-2006/053954 A1 | 5/2006 | |
| WO | WO-2006/058967 A1 | 6/2006 | |
| WO | WO-2007/015725 A2 | 2/2007 | |
| WO | WO-2007/015726 A1 | 2/2007 | |
| WO | WO-2007/149526 A2 | 12/2007 | |
| WO | WO-2007/149540 A2 | 12/2007 | |
| WO | WO-2011126889 A2 | 10/2011 | |

OTHER PUBLICATIONS

Android Developers, "Date," 10 pages, Oct. 27, 2011.
Augun, Audrey, "Integrating Lotus Notes With Enterprise Data," Lotus Notes Advisory, pp. 22-25, Jul.-Aug. 1996.
Balaban, Bob, "This Is Not Your Father's Basic: LotusScript in Notes Release 4," The View, vol. 1, Issue 5, 32 pages, Nov.-Dec. 1995.
Bedell, Doug, "Meeting Your New Best Friends Six Degrees Widens Your Contacts in Exchange for Sampling Web Sites," The Dallas Morning News, 4 pages, Oct. 27, 1998.
Bergman, Lawrence D. et al., "Programming-By-Demonstration for Behavior-Based User Interface Customization," IBM Research Report, RC23116, 5 pages, Feb. 20, 2004.
B'Far, Reza et al., "Designing Effective User Interfaces for Wireless Devices," Publication Unknown, 14 pages, Published prior to Feb. 23, 2006.
Blaney, Jeff, "You Can Take It With You—An Introduction to Mobile Computing With Notes R4," The View, vol. 2, Issue 1, 14 pages, Jan.-Feb. 1996.
Braden, R., "Requirements for Internet Hosts—Application and Support," RFC 1123, 80 pages, Oct. 1989.
Brown, Kevin et al., "Mastering Lotus Notes®," Sybex Inc., 996 pages, 1995.
"Chapter: About NotesPump," Publication Unknown, 480 pages, Published prior to Jan. 8, 2003.
"Chapter 13-1—Anatomy of a Note ID," Publication Unknown, 8 pages, Published prior to Jan. 8, 2003.
Cole, Barb et al., "Lotus Airs Notes-To-Database Integration Tool," Network World, 2 pages, Oct. 2, 1995.
"CR 3483 to Release 8 TS 25.331, Rev. 2," 3GPP TSG-RAN2 Meeting #64, Prague, Czech Republic, 11 pages, Nov. 10-14, 2008.
"CR 4100 to Release 8 TS 25.331, Rev. 1," 3GPP TSG-RAN WG2 Meeting #69, San Francisco, U.S., 6 pages, Feb. 22-26, 2010.
Dahl, Andrew, "Lotus Notes® 4 Administrator's Survival Guide," Sams Publishing, 64 pages, 1996.
Decker, Stefan et al., "The Social Semantic Desktop," Digital Enterprise Research Institute, DERI Technical Report May 2, 2004, 7 pages, May 2004.
Elz, R. et al., "Clarifications to the DNS Specification," RFC 2181, 12 pages, Jul. 1997.
European Patent Application No. EP 03705704.9, Supplementary European Search Report, 4 pages, Jun. 9, 2010.
European Patent Application No. EP 03707338.4, Supplementary European Search Report, 2 pages, Apr. 18, 2011.
European Patent Application No. EP 05815115.0, Supplementary European Search Report, 7 pages, Nov. 17, 2011.
Falkner, Mike, "How to Plan, Develop, and Implement Lotus Notes® in Your Organization," John Wiley & Sons, Inc., 539 pages, 1996.
Freeland, Pat et al., "Lotus Notes 3-3.1 for Dummies™," IDG Books Worldwide, 389 pages, 1994.
Frenkel, Garry, "Pumping for Info: Notes and Database Integration," Network Computing, 10 pages, May 1, 1996.
Gameline, Advertisement, 1 page, 1982.
Gewirtz, David, "Lotus Notes 3 Revealed!," Prima Publishing, 261 pages, 1994.
Grous, Paul J., "Creating and Managing a Web Site With Lotus Internotes Web Publisher," The View, vol. 1, Issue 4, 20 pages, Sep.-Oct. 1995.
GSM Association, "Network Efficiency Task Force Fast Dormancy Best Practices," V1.0, 21 pages, May 26, 2010.
Haas, Zygmunt J. et al., "Mobile-TCP: An Asymmetric Transport Protocol Design for Mobile Systems," IEEE, pp. 1054-1058, 1997.
Haas, Zygmunt J. et al., "The Design and Performance of Mobile TCP for Wireless Networks," Journal of High Speed Networks, vol. 10, pp. 187-207, 2001.
Hajdu, Kalman et al., "Lotus Notes Release 4 in a Multiplatform Environment," IBM Corporation, 173 pages, Feb. 1996.
Hardy, Ed, "Microsoft Proposes Two New Thumb-Driven User Interfaces," Brighthand Consulting, Inc., 2 pages, 2003.
IBM Corporation, "The Architecture of Lotus Notes," White Paper No. 114654, 26 pages, May 31, 1995.
IBM Corporation, "The History of Notes and Domino," Lotus Developer Domain, 11 pages, Sep. 29, 2003.
ImTOO, "ImTOO iPod Movie Converter," 3 pages, Nov. 9, 2005.
IntelliLink Corporation, "IntelliLink® for Windows User's Guide," Version 3.0, 167 pages, 1994.
International Application No. PCT/US2003/000618, International Search Report, 1 page, Apr. 4, 2003.
International Application No. PCT/US2003/000624, International Search Report, 2 pages, May 13, 2003.
International Application No. PCT/US2005/037702, International Preliminary Examination Report, 6 pages, Nov. 20, 2007.
International Application No. PCT/US2005/037702, International Search Report, 1 page, Nov. 5, 2007.
International Application No. PCT/US2005/037702, Written Opinion, 6 pages, Nov. 5, 2007.
International Application No. PCT/US2005/038135, International Search Report, 2 pages, Aug. 8, 2008.
International Application No. PCT/US2005/038135, Written Opinion, 8 pages, Aug. 8, 2008.
International Application No. PCT/US2005/038135, International Preliminary Report on Patentability, 9 pages, Oct. 31, 2011.

International Application No. PCT/FI2005/050424, International Search Report, 4 pages, Mar. 2, 2006.
International Application No. PCT/FI2005/050426, International Search Report, 3 pages, Mar. 1, 2006.
International Application No. PCT/FI2005/050441, International Search Report, 3 pages, Mar. 1, 2006.
International Application No. PCT/US2006/023426, International Search Report, 1 page, Feb. 21, 2007.
International Application No. PCT/US2006/023427, International Search Report, 1 page, Oct. 12, 2006.
International Application No. PCT/US2007/014462, International Search Report, 1 page, Jul. 2, 2008.
International Application No. PCT/US2007/014497, International Search Report, 1 page, Aug. 25, 2008.
International Application No. PCT/US2011/030534, International Search Report, 10 pages, Dec. 29, 2011.
International Application No. PCT/US2011/037932, International Search Report, 9 pages, Jan. 2, 2012.
International Application No. PCT/US2011/037943, International Search Report, 11 pages, Jan. 2, 2012.
Japanese Patent Application No. 2003-558726, Office Action, 2 pages, Jun. 10, 2008.
Karlson, Amy K. et al., "AppLens and LaunchTile: Two Designs for One-Handed Thumb Use on Small Devices," Proceedings of CHI 2005, 10 pages, Apr. 2-7, 2005.
Kent, S. et al., "Security Architecture for the Internet Protocol," RFC 2401, The Internet Society, 62 pages, Nov. 1998.
Kleinberg, Jon, "The Small-World Phenomenon: An Algorithmic Perspective," Cornell Computer Science Technical Report 99-1776, 14 pages, Oct. 1999.
Koeppel, Dan, "GUIs Just Want to Have Fun," Wired Magazine, Issue 8.10, 12 pages, Oct. 2000.
Kornblith, Polly Russell, "Lotus Notes Answers: Certified Tech Support," Covers Release 3, McGraw-Hill, Inc., 326 pages, 1994.
Kreisle, Bill, "Teach Yourself . . . Lotus Notes 4," MIS Press, 464 pages, 1996.
Lamb, John P. et al., "Lotus Notes Network Design," McGraw-Hill, 278 pages, 1996.
Londergan, Stephen et al., "Lotus Notes® Release 4 for Dummies®," IDG Books Worldwide, 229 pages, 1996.
Lotus Development Corporation, "Firewall Security Overview and How Firewalls Relate to Lotus Notes," Lotus Notes Knowledge Base, 9 pages, May 22, 1996.
Lotus Development Corporation, "How to Set Up 'Firewall' Protection for a Notes Domain," Lotus Notes Knowledge Base, 2 pages, Nov. 6, 1995.
Lotus Development Corporation, "Lotus Announces Lotus NotesPump 1.0," Lotus Notes Knowledge Base, 6 pages, Oct. 31, 1995.
Lotus Development Corporation, "Lotus Inside Notes—The Architecture of Notes and the Domino Server," 207 pages, 2000.
Lotus Development Corporation, "Lotus NotesPump 1.0 Q & A," Lotus Notes Knowledge Base, 3 pages, Oct. 31, 1995.
Lotus Development Corporation, "Lotus NotesPump: Database Integration for Lotus Notes," Lotus Notes Knowledge Base, 5 pages, Oct. 31, 1995.
Lotus Development Corporation, "Lotus Notes Administration," Release 3.3, 20 pages, 1995.
Lotus Development Corporation, "Lotus Notes Administrator's Guide," Release 4, 499 pages, 1995.
Lotus Development Corporation, "Lotus Notes Administrator's Guide—Server for NetWare, OS-2, and Unix," Release 3.1, 509 pages, 1994.
Lotus Development Corporation, "Lotus Notes Administrator's Guide—Server for Windows," Release 3.1, 345 pages, 1994.
Lotus Development Corporation, "Lotus Notes Application Developers Guide," Release 4, 475 pages, 1995.
Lotus Development Corporation, "Lotus Notes Customer Service Application Guide," Release 3.1, 46 pages, 1994.
Lotus Development Corporation, "Lotus Notes Customer Support Guide," 33 pages, Published prior to Jan. 8, 2003.
Lotus Development Corporation, "Lotus Notes Customer Support Guide—North American Guide," Release 4.1, 51 pages, Published prior to Jan. 8, 2003.
Lotus Development Corporation, "Lotus Notes Database Manager's Guide," Release 4, 115 pages, 1995.
Lotus Development Corporation, "Lotus Notes Deployment Guide," Release 4, 104 pages, 1995.
Lotus Development Corporation, "Lotus Notes for Windows, OS-2, and Macintosh," Release 3.3, 89 pages, 1995.
Lotus Development Corporation, "Lotus Notes Getting Started With Application Development," Release 3.1, 151 pages, 1994.
Lotus Development Corporation, "Lotus Notes Install Guide for Servers," Release 4, 68 pages, 1996.
Lotus Development Corporation, "Lotus Notes Install Guide for Workstations," Release 4, 28 pages, 1995.
Lotus Development Corporation, "Lotus Notes Install Guide for Workstations," Release 4.1, 67 pages, 1996.
Lotus Development Corporation, "Lotus Notes Install Guide for Workstations," Release 4.5, 81 pages, 1996.
Lotus Development Corporation, "Lotus Notes Internet Cookbook for Notes Release 3," 21 pages, Jan. 16, 1996.
Lotus Development Corporation, "Lotus Notes Internet Cookbook for Notes Release 4," 35 pages, Feb. 14, 1996.
Lotus Development Corporation, "Lotus Notes Internotes Web Navigator Administrator's Guide," Release 4, 60 pages, 1995.
Lotus Development Corporation, "Lotus Notes Internotes Web Navigator User's Guide," Release 4, 56 pages, 1995.
Lotus Development Corporation, "Lotus Notes Internotes Web Publisher Guide," Release 4, 122 pages, 1996.
Lotus Development Corporation, "Lotus Notes LotusScript Classes for Notes," Release 4, 6 pages, Published prior to Jan. 8, 2003.
Lotus Development Corporation, "Lotus Notes Migration Guide," Release 4, 110 pages, 1996.
Lotus Development Corporation, "Lotus Notes Network Configuration Guide," Release 4.5, 121 pages, 1996.
Lotus Development Corporation, "Lotus Notes Network Driver Documentation," Release 3.1, 100 pages, 1994.
Lotus Development Corporation, "Lotus Notes Programmer's Guide—Part 1," Release 4, 614 pages, 1995.
Lotus Development Corporation, "Lotus Notes Programmer's Guide—Part 2," Release 4, 462 pages, 1995.
Lotus Development Corporation, "Lotus Notes Quick Reference for Application Developers," Release 3, 6 pages, Published prior to Jan. 8, 2003.
Lotus Development Corporation, "Lotus Notes Quick Reference for Macintosh," Release 3, 6 pages, Published prior to Jan. 8, 2003.
Lotus Development Corporation, "Lotus Notes Quick Reference for SmartIcons," Release 3.1, 4 pages, Published prior to Jan. 8, 2003.
Lotus Development Corporation, "Lotus Notes Quick Reference for Windows and Presentation Manager," Release 3, 6 pages, Published prior to Jan. 8, 2003.
Lotus Development Corporation, "Lotus Notes Release Notes," Release 4, 139 pages, 1995.
Lotus Development Corporation, "Lotus Notes Release Notes," Release 4.1, 197 pages, 1996.
Lotus Development Corporation, "Lotus Notes Server for Windows," Release 3.3, 7 pages, 1994.
Lotus Development Corporation, "Lotus Notes Server Up and Running!," Release 4, 13 pages, 1996.
Lotus Development Corporation, "Lotus Notes Site and Systems Planning Guide," Release 3.1, 169 pages, 1994.
Lotus Development Corporation, "Lotus Notes Start Here—Workstation Install for Windows, OS-2 and Macintosh," Release 3.3, 47 pages, 1995.
Lotus Development Corporation, "Lotus Notes Step by Step—A Beginner's Guide to Lotus Notes," Release 4, 179 pages, 1995.
Lotus Development Corporation, "Lotus Notes Step by Step—A Beginner's Guide to Lotus Notes," Release 4.1, 167 pages, 1996.
Lotus Development Corporation, "Lotus Software Agreement," 8 pages, Published prior to Jan. 8, 2003.
Lotus Development Corporation, "What Is the Notes Replicator?," Lotus Notes Knowledge Base, 8 pages, Jul. 5, 1995.

"Lotus Notes Advisor," Advisor Publications Inc., 55 pages, Jun. 1995.
"Lotus Notes Advisor," Advisor Publications Inc., 55 pages, Aug. 1995.
"Lotus Notes Advisor," Advisor Publications Inc., 55 pages, Oct. 1995.
"Lotus Notes Advisor," Advisor Publications Inc., 55 pages, Dec. 1995.
"Lotus Notes Advisor," Advisor Publications Inc., 63 pages, Jan.-Feb. 1996.
"Lotus Notes Advisor," Advisor Publications Inc., 55 pages, Apr. 1996.
"Lotus Notes Advisor," Advisor Publications Inc., 55 pages, Jun. 1996.
"Lotus Notes Advisor," Advisor Publications Inc., 55 pages, Aug. 1996.
"Lotus Notes Advisor," Advisor Publications Inc., 55 pages, Oct. 1996.
"Lotus Notes Advisor," Advisor Publications Inc., 63 pages, Dec. 1996.
"Lotus Notes—Notes Administration Help," Screen Shots, 17 pages, Published prior to Jan. 8, 2003.
MacGregor, Rob et al., "The Domino Defense: Security in Lotus Notes and The Internet," IBM Corporation, 183 pages, Dec. 1997.
Maltz, David A. et al., "MSOCKS: An Architecture for Transport Layer Mobility," IEEE, pp. 1037-1045, 1998.
Marmel, Elaine, "Easy Lotus® Notes Release 4.0," Que Corporation, 237 pages, 1996.
Mason, Luke, "Windows XP: New GUI Design Shows Skin Is In," TechRepublic, 4 pages, Apr. 4, 2001.
McMullen, Melanie, "Network Remote Access and Mobile Computing," Miller Freeman Inc., 226 pages, 1994.
Microsoft, Definition of "Access," Microsoft Computer Dictionary, Fifth Edition, 2 pages, May 1, 2002.
Microsoft, Definition of "Synchronization," Microsoft Computer Dictionary, Fifth Edition, 2 pages, May 1, 2002.
Milgram, Stanley, "The Small-World Problem," Psychology Today, vol. 2, pp. 60-67, 1967.
Miller, Victor S., "Use of Elliptic Curves in Cryptography," Advances in Cryptology—CRYPTO '85 Proceedings, vol. 218, pp. 417-426, 1985.
Mockapetris, P., "Domain Names—Concepts and Facilities," RFC 1034, 43 pages, Nov. 1987.
Mockapetris, P., "Domain Names—Implementation and Specification," RFC 1035, 43 pages, Nov. 1987.
Myers, Brad A. et al., "Extending the Windows Desktop Interface With Connected Handheld Computers," WSS'00 Proceedings of the 4th Conference on USENIX Windows Systems Symposium, vol. 4, 10 pages, 2000.
Myers, Brad A. et al., "User Interfaces That Span Hand-Held and Fixed Devices," CHI'2001 Workshop on Distributed and Disappearing User Interfaces in Ubiquitous Computer, 4 pages, 2001.
National Institute of Standards and Technology, "Advanced Encryption Standard (AES)," Federal Information Processing Standards Publication 197, 52 pages, Nov. 26, 2001.
National Institute of Standards and Technology, "Secure Hash Standard," Federal Information Processing Standards Publication 180-2, 83 pages, Aug. 1, 2002.
Netscape Communications Corporation, "Netscape Mail Server Administrator's Guide," Version 2.0, 172 pages, 1996.
Netscape Communications Corporation, "Netscape Mail Server Installation Guide," Version 2.0 for Unix, 62 pages, 1996.
Netscape Communications Corporation, "Netscape Mail Server User's Guide," Version 2.0, 35 pages, 1996.
Netscape Communications Corporation, "Netscape News Server Administrator's Guide for Windows NT," Version 2.0, 119 pages, 1996.
Niederée, Claudia et al., "A Multi-Dimensional, Unified User Model for Cross-System Personalization," Proceedings of the AVI 2004 Workshop on Environments for Personalized Information Access, 11 pages, 2004.
Nokia, "Developer Platforms," 3 pages, 2005.
"NotesPump 1.0 Release Notes," Publication Unknown, 8 pages, Published prior to Jan. 8, 2003.
Opyt, Barbara et al., "Use the Internet As Your Lotus Notes WAN," Lotus Notes Advisor, pp. 17-20, Nov.-Dec. 1996.
Ortiz, C. Enrique, "An Introduction to the Symbian OS™ Platform for Palm OS® Developers," Metrowerks Corp., 21 pages, 2002.
"Overview—What Is Lotus NotesPump?," Publication Unknown, 88 pages, Published prior to Jan. 8, 2003.
Perez, Sarah, "Onavo's Data-Compressing Mobile App Raises $10 Million Series B From Horizons, Motorola Ventures," 2 pages, Jan. 24, 2012.
Phillips, Joshua et al., "Modeling the Intelligence Analysis Process for Intelligent User Agent Development," Research and Practice in Human Resource Management, vol. 9, No. 1, pp. 59-73, 2001.
Pyle, Hugh, "The Architecture of Lotus Notes," Lotus Notes Advisor, Premiere Issue, pp. 18-27, 1995.
Pyle, Lisa, "A Jump Start to the Top Ten R3-To-R4 Migration Considerations," The View, vol. 1, Issue 5, 22 pages, Nov.-Dec. 1995.
Qualcomm, "System Parameter Recommendations to Optimize PS Data User Experience and UE Battery Life," 80-W1112-1, Revision B, 9 pages, Mar. 2007.
Ringel, Meredith et al., "iStuff: A Scalable Architecture for Lightweight, Wireless Devices for Ubicomp User Interfaces," Proceedings of UbiComp 2002, 2 pages, 2002.
Shafran, Andrew Bryce, "Easy Lotus® Notes® for Windows™," Que Corporation, 199 pages, 1994.
Signorini, Eugene, "SEVEN's Service-Based Wireless Solutions Enable Enterprises to Untether E-Mail," Wireless/Mobile Enterprise & Commerce, 16 pages, Oct. 2004.
Swedeen, Bret et al., "Under the Microscope—Domino Replication," LDD Today, 8 pages, Oct. 1, 1998.
Tamura, Randall A., "Lotus® Notes™ 4 Unleashed," Sams Publishing, 928 pages, 1996.
U.S. Appl. No. 60/663,463, File History, 113 pages, Mar. 18, 2005.
Vivacqua, Adriana et al., "Profiling and Matchmaking Strategies in Support of Opportunistic Collaboration," CoopIS/DOA/ODBASE 2003, LNCS 2888, pp. 162-177, 2003.
Wainwright, Andrew, "Secrets to Running Lotus Notes: The Decisions No One Tells You How to Make," IBM Corporation, 193 pages, Oct. 1996.
Wilcox, Adam A., "PC Learning Labs Teaches Lotus Notes 3.0," Ziff-Davis Press, 381 pages, 1993.
Wong, Harry, "Casahl's Replic-Action: Delivering True Notes-DBMS Integration," The View, vol. 2, Issue 1, pp. 33-50, Jan.-Feb. 1996.

* cited by examiner

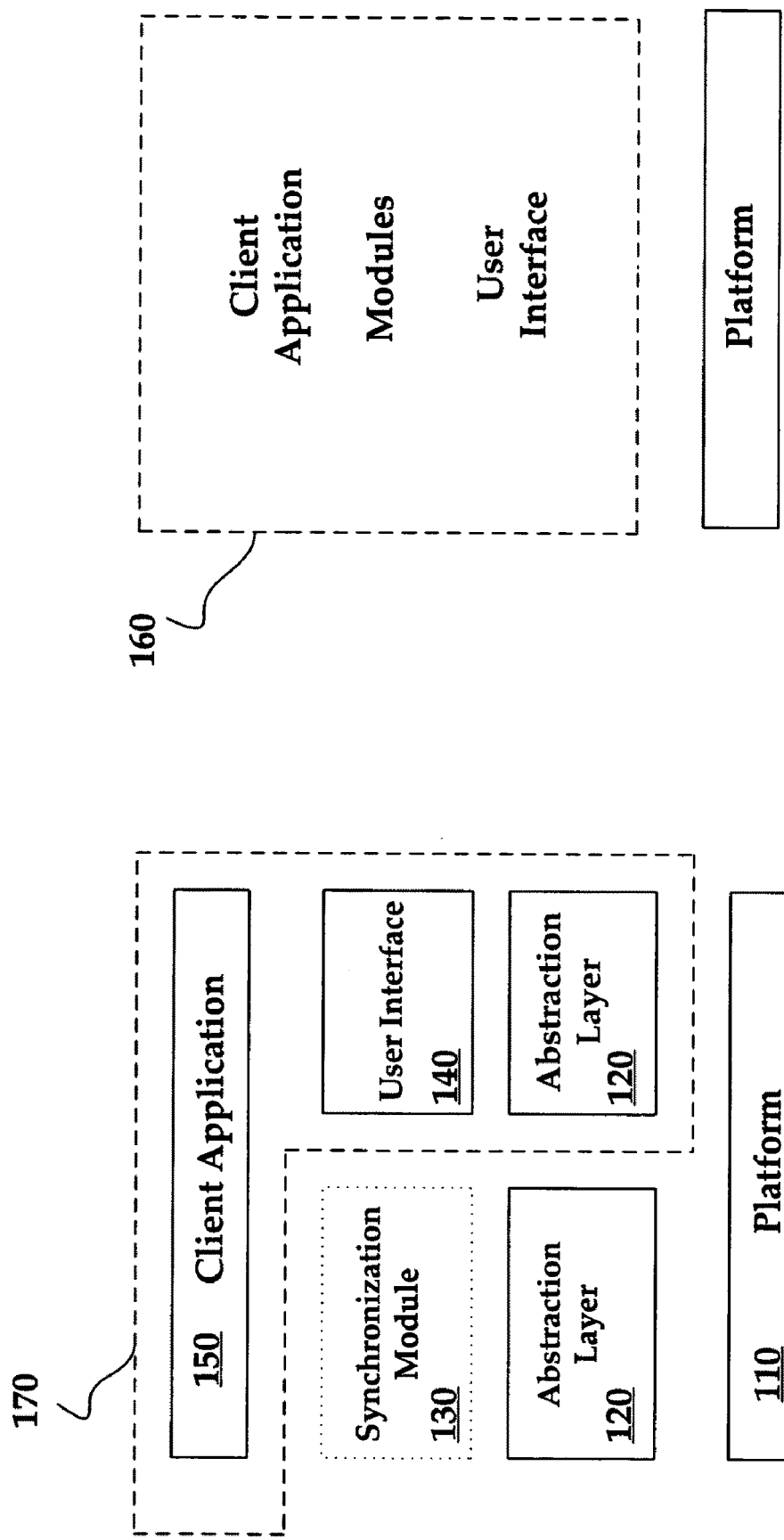

CROSS-PLATFORM EVENT ENGINE

CROSS-REFERENCE TO RELATED APPLICATIONS

This application is a continuation of U.S. patent application Ser. No. 11/227,323 filed Sep. 14, 2005, now U.S. Pat. No. 7,752,633 which claims the priority benefit of U.S. Provisional Application Ser. No. 60/661,757 filed Mar. 14, 2005 and entitled "Agnostic User Interface for Use in Mobile Devices," the disclosure of which is incorporated herein by reference.

This application is related to U.S. patent application Ser. No. 11/123,540 filed May 5, 2005, now abandoned, the disclosure of which is incorporated herein by reference. This application is also related to U.S. patent application Ser. No. 11/227,013 filed Sep. 14, 2005 and U.S. patent application Ser. No. 11/227,272 filed Sep. 14, 2005, now abandoned. All the aforementioned applications are commonly owned and assigned.

BACKGROUND OF THE INVENTION

1. Field of the Invention

The present invention relates generally to the field of user interfaces. More specifically, the present invention relates to the recognition and processing of platform events by user interfaces, those interfaces operating across various platforms on various mobile devices.

2. Description of the Related Art

Mobile data access devices make it simple and affordable to access corporate and personal data while out of the office. Software allowing for such access is becoming a standard feature on a variety of mobile devices and platforms: BREW, Pocket PCs, Smartphones, Symbian-based phones, PDAs and Internet browsers.

There are approximately 35 million workers that make up the 'mobile workforce,' that is, individuals who carry out all or substantial portions of their job away from a physical office setting. With the increasing number of on-the-go workers, electronic mail continues to be, arguably, the most important business application. As a result, this workforce—as well as the casual individual user—has an inherent need for mobile access to their electronic mail and other data.

Despite an ever-increasing need for access to electronic mail and data, costs of ownership for mobile data access remain a barrier. The issue is no longer whether mobile data access is a necessity but whether it can be deployed and managed in an effective manner.

While cost is an obvious concern in equipping the workforce with the means for accessing data on-the-go, the implementation, development, integration and management of mobile data access solutions are of paramount interest. Despite mobile devices becoming a staple in personal and commercial enterprise, rapidly evolving changes such as number portability, mergers in the telecommunications and software industry and the lack of any one particular technical standard in the mobile device technological space, make providing support for a wide-array of mobile devices an important, albeit difficult, issue with regard to accessing data from a mobile device. The lack of internal expertise, the immaturity of standards, the complexity of integration, device limitations and application development have all been explicitly recognized as barriers to adopting mobile devices for providing access to data while, for example, out of the office or away from a personal desktop computer.

Increased user-flexibility—user familiarity amongst a variety of different devices and/or platforms—may be provided by device-neutral software as is described in the present application. For example, a single application (e.g., a notepad or an e-mail application) could be run on various mobile devices. The user-flexibility proffered by device-neutral software helps to improve IT-familiarity and expertise in that IT personnel need only become familiar with one software application (or suite of applications) instead of a particularized application for each individual platform environment and/or mobile device. Such device and platform neutrality increases end-user adoption of mobile device technologies in their fullest sense thereby better ensuring a return on investment.

But as adoption and pervasiveness of mobile devices and operating platforms increase, so does technological fragmentation within the marketplace. That is, with the increasing availability of differing mobile devices and operating platforms, there is an increase in disjunct technologies and methodologies that evidence an increasing need for standardization. Until there exists an overarching technological standard adopted by or at least a significant portion of the marketplace, developing device- and/or platform-neutral applications, as are taught in the present application, for mobile devices makes application development and testing less of a colossal task for software engineers while ensuring higher quality and better overall design.

Device-neutral user interfaces, like those described in the present application, will play a critical role in mobile device development. Such interfaces must not only provide access to mission critical data but also deal with the realities of variations in screen size, pixel density, aspect ratio and screen use availability amongst devices; limited memory on a mobile device; limited processing power; general quirkiness between platforms; and, perhaps most noticeable to the end-user, the general lack of space for interacting with the mobile device (e.g., keyboard space for text-entry and display space for viewing data). A keyboard, mouse or even a stylus are normally not available for such interaction in a traditional wireless or mobile device. Not only is input difficult, so is viewing a display rendering information. This is especially true when the mobile device happens to also be a cellular telephone.

Engineers have previously been forced to deal with the fact that present-day prior art interfaces are not be suitable for more than one primary set of devices. For example, PDAs utilize a stylus and touch-screen whereas cellular phones may utilize a keypad and/or five-way navigation. If an engineer is satisfied with limiting an interface to a particular type of environment (e.g., platform or device), the engineer must still deal with the nuances of particular device manufacturers (e.g., a Palm PDA versus a Nokia cell phone) and, in some instances, particular device models (e.g., PALM VIIx and Nokia 7110).

An engineer is still, in many instances, limited by the fact that he or she must pre-generate static interfaces or multiple permutations of the interface as they pertain to a particular device or platform family. This results in delays for delivery of applications and increased costs in research and development, which inevitably result in increased costs for the end-user.

There is, therefore, a need in the art for a user interface that is neutral with regard to operating platform and device wherein one client interface will work on multiple platforms and devices.

It should be noted, in the course of this disclosure, that while a device (e.g., hardware) and platform (e.g., software)

are recognized as distinct—albeit related—entities, any reference to a device or a platform should be considered inclusive of both. Similarly, any reference to the neutrality of an interface, in general, should be interpreted as neutrality as to both a device and a platform.

Further, it should be noted that any disclosed device or platform-neutral user interface is not dependent on the presentation or transmission of communications data (e.g., electronic mail, calendar, SMS) or utilization of user data (e.g., data stored on a desktop).

SUMMARY OF THE INVENTION

The present invention advantageously provides a virtual platform neutral to physical device or software/hardware operating platform. The virtual platform comprises an abstraction layer that allows for portability across a variety of mobile devices and operating platforms, especially with regard to user interfaces. The virtual platform and abstraction layer and any related software allow for a user interface on a first device to appear and operate substantially similar to a user interface on a second device regardless of differences or limitations that may exist between the operating systems or physical nuances of the two devices. By providing a device-neutral user interface application, a user can move effortlessly between devices should, for example, the need for replacement or repair of a particular device arise or if the user possess multiple mobile devices (e.g., one device for personal use and a second device for work use).

Additionally, the neutrality of the interface application makes it possible for software developers and engineers to utilize one test suite for a variety of devices or platforms when introducing new features thereby reducing lag-time in delivering applications to market as well as research and development costs. For example, instead of developing five different interfaces for five different devices, one interface may be utilized across five different devices. These reductions in the time and cost of development and delivery inevitably translate into savings for the end-user and/or increases in profit and competitiveness for the application and/or device developer/manufacturer.

The present invention also provides an advantageous cross-platform event engine for recognizing, generating and/or acting upon disparate events amongst a variety of devices or platforms. For example, an event request recognized on one device is translated into a native request recognized on a second device through abstraction and code sharing. Methods for determining the portability of an event from, for example, a first device environment to a second device are also provided. The present invention is not, however, meant to be limited to device-to-device portability as it allows for a common representation of an event outside of its native environment.

BRIEF DESCRIPTION OF THE DRAWINGS

FIG. 1A illustrates an exemplary embodiment of a device platform comprising various operational layers and modules for interaction with a particular device client and as described in the present invention.

FIG. 1B illustrates a device platform comprising various operational layers and modules for interaction with a particular device client as may be found in the prior art.

DETAILED DESCRIPTION OF AN EXEMPLARY EMBODIMENT

Figure 2A:
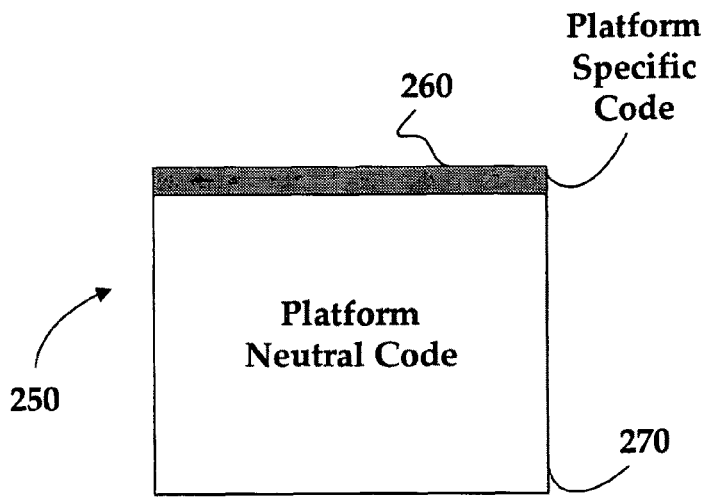
FIG. 2A illustrates an exemplary embodiment of an abstraction layer and a balance of platform-specific code and platform-neutral code as may be found in a device- and/or platform-neutral interface such as that described in the present invention.

FIG. 1A illustrates an exemplary embodiment of a device including various operational layers and modules for interaction with the device. The present embodiment comprises a platform 110, abstraction layers 120, optional synchronization module 130, user interface 140, and client application 150.

Some embodiments of the present invention may comprise additional operational layers such as open or proprietary application program interfaces (APIs) that allow software engineers, programmers and even users of a particular platform and/or device to author or install applications that are compatible with the particular platform's operating environment. A cross-platform event engine may be embodied in such an application. Some embodiments of the present invention may lack certain operational layers or modules, such as synchronization module 130. Such modules would be absent should a particular device or platform not require, for example, synchronization operations.

The platform 110 is the underlying hardware and/or software for a particular operating environment. The platform 110 also defines a particular operating environment in which software, hardware and other applications are developed. An example of platform 110 is the Nokia Series 40 Developer Platform. The Nokia Series 40 Developer Platform can utilize platform technologies such as Java™ J2ME. Another example of platform 110 is the Nokia Series 60 and Series 80 Developer Platforms. The Nokia Series 60 and 80 platforms can utilize C++ in addition to Java™ J2ME technologies. The Palm OS® Platform, as another example of platform 110, supports native programming in C and C++ languages as well as Java programming via third-party Java Virtual Machines. The present invention further envisions the future development of operating environments on a variety of platforms.

Abstraction layer(s) 120 provide basic functionalities and means for accomplishing various operating goals that allow for, in part, the interoperation of the platform 110 with the client application 150 as well as other operational layers such as user interface 140. The abstraction layer(s) 120 provide classes, interfaces, abstract methods and other facilities and resources intended to support various functions and software operations regardless of any particular platform 110 or implementation on any particular device. Abstraction layer(s) 120 may be open or proprietary and are often composed of various information modules (e.g., FIG. 3).

Optional synchronization module 130 comprises the various operational instructions, functionalities and code necessary to allow a particular device or a program residing on such a device to communicate with an external data source, such as a desktop personal computer or enterprise server.

Communications allowing for a synchronization operation can be achieved in a variety of ways including a cable-to-handset synchronization mechanism whereby the device is physically coupled to a desktop personal computer to allow for the exchange and synchronization of data (e.g., electronic mail). Communications can also be achieved wirelessly whereby an enterprise server (e.g., a Microsoft Exchange Server) configured with appropriate software (e.g., SEVEN Server Edition from SEVEN Networks, Inc. of Redwood City, Calif.) coupled with access to a wireless gateway allows for access to electronic mail and other data by the device without any physical connection. Communications can also be achieved without intermediate server software or gateways (e.g., wirelessly).

Synchronization should be appreciated in the most general sense (e.g., as a communication event). For example, synchronization may comprise not only maintaining the consistency of data between two points (e.g., real time calendar data on a handheld device and a desktop computer) but also the duplication of data (e.g., received emails at a desktop forwarded to a handheld). Synchronization may also be utilized for the purpose of updating information (e.g., receiving updated software packages, patches and so forth).

While the optional synchronization module 130 may be necessary for synchronizing the client device and other external data source (e.g., a server), the presence of such a module is not meant to be interpreted as a prerequisite for the operation of a device-neutral user interface.

The user interface 140 comprises and/or is coupled to various modules and software components and source code to allow for the rendering and operation of a user interface on a variety of devices. The user interface 140 comprises or is otherwise coupled to libraries comprising elements and abstractions such as icons, cursors, scroll bars, sounds, animations, etc. and the necessary software and code to enable their use. In an embodiment of the present invention, the user interface 140 is neutral with regard to a particular device or operation environment. That is, a single interface can operate across a plurality of devices (e.g., Nokia, Kyocera and Treo) and/or environments (e.g., Nokia and PalmOS®) without the need to be reprogrammed for each of these particular devices and/or environment. That is, one user interface 140 fits a broad universe of devices and/or environments.

The client application 150 resides on any device coupled to a network (e.g., wirelessly) that allows for access to a server device or other computing entity, such as a second client device. Through the coupling of the device to, for example, a server, the user of the device may receive and transmit data such as electronic mail or access data stored at the server. It should further be appreciated that the present invention may also operate in a device that is not coupled or connected to any particular network or second device.

Small handheld devices are increasingly mobile. This mobility is often a direct result of integrating the handheld device with, for example, a cellular telephone although it is not necessary for the device and related client application 150 to be integrated with a cellular phone or any other particular device.

Mobile devices are often associated with a particular platform 110. For example, the aforementioned Nokia Series 40 Developer Platform is associated with the Nokia 6101 and 6102 model client devices as well as the Nokia 6020, 6235, 6235i and 6822 model client devices. The Nokia Series 60 Developer Platform, on the other hand, is associated with client devices such as the Nokia 6680, 6681, and 6682 model devices. Similarly, the Palm OS® Platform is associated with client devices such as Xplore™ G18, Kyocera 7135, and the Treo™ 650.

FIG. 1B illustrates various operational layers for user interaction and general operation within a particular device as may be found in the prior art. Such a prior art device may comprise the actual platform and various operational layers such as synchronization modules, APIs and so forth.

Prior art devices differ from a device utilized in the context of an embodiment of the present invention in that the client application, user interface and other applications are more integrated, interdependent and operationally incorporated (160) as compared to the present invention (170), which allows for increased flexibility and operability. The 'tightly wound' nature of the prior art is often the result of a general lack of portability of a user interface or any other software between various devices. That is, a particular application, including an interface, is written exclusively for a particular platform and exclusively for a particular device solely in conjunction with that platform. In order for a similar interface with similar functional offerings to operate on another device or platform, that interface must be re-authored in its entirety.

The exemplary device platform illustrated in FIG. 1A, on the other hand, evidences the ability to transport various functionalities from one platform or device to the next, especially with regard to the design of the abstraction layer 120 as is further discussed in the context of FIGS. 2A and 2B, below.

It should be noted that while FIG. 1A illustrates various operational layers as separate elements, this is not to suggest a necessary physical differentiation or a general lack of integration in an embodiment. Similarly, the integration of the client, user interface and abstraction layer (160) in FIG. 1B is not meant to suggest a literal, physical integration. These illustrations are provided merely to aid in the perception of the 'tightly wound' and vertically integrated aspects of the prior art versus an embodiment of the present invention, allowing for cross-platform events processing.

Figure 2B:
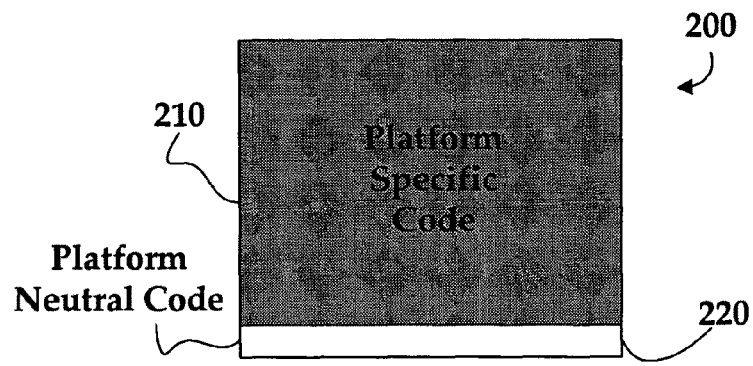
FIG. 2B illustrates a typical balance of platform-specific code and platform-neutral code as may generally be found in the prior art.

FIG. 2B illustrates a balance of platform specific code 210 and platform-neutral code 220 as may be found in the prior art.

For example, and as previously described in the context of FIG. 1B, prior art devices and their related platform and software are generally unitary in nature and are not meant to allow for portability of features, such as a user interface. As such, the prior art code 200 is monolithic in nature and comprised predominantly of platform-specific and application-specific code 210 (e.g., code written for, and only for, a Nokia 6680 device and configured with software written for the Series 60 Developer Platform environment).

This particularized code, while allowing for the integration and operation of a particular device on a particular platform, inhibits the portability of any particular features from one device to another (e.g., a user interface) as may otherwise be provided for with more generalized or device/platform-neutral code 220. Such device/platform-neutral code 220 may comprise code written in accordance with particular industry standards or specifications but that allows for the portability or interoperability of a specific and particular feature amongst devices. This neutral code 220 is minimally—if at all—present in prior art devices.

FIG. 2A illustrates an exemplary embodiment of an abstraction layer 250 and a blend of platform-specific code 260 and platform-neutral code 270 as may be found in a device-neutral user interface offering cross-platform event processing functionality.

An abstraction layer 250, as may be found in an embodiment of the present invention and as illustrated in FIG. 2A, exhibits a much 'thinner' layer of platform- or device-specific code 260. In some embodiments of the present invention, platform specific code may be entirely non-existent. Abstraction layer 250, with its thin layer of platform- or device-specific code 260 may be, generally, the type of abstraction layer 120 as described in FIG. 1A.

As the abstraction layer 250 comprises more platform- or device-neutral code 270, the portability or interoperability of particular features—including a user interface offering cross-platform event processing—is increased in that a feature (e.g., an application or function) will operate on various platforms or devices due to its coding being dependent more on the generalized code 270 than with platform- or device-specific code 260 that limits or inhibits portability or interoperability.

Figure 3:
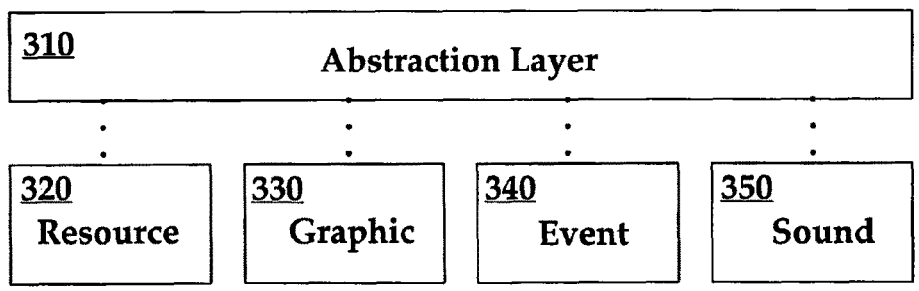
FIG. 3 illustrates an exemplary embodiment of an abstraction layer comprising various informational modules as described in the present invention.

FIG. 3 illustrates an exemplary embodiment of an abstraction layer 310 comprising various informational modules 320-350 as may be implemented in the abstraction layer 250 illustrated in FIG. 2A.

Informational modules 320-350 comprise routines and instructions as they pertain to various operational features of, for example, a particular platform 110 and/or client application 150 linked in the abstraction layer 310. These modules link the particular device to the particular platform.

For example, resource module 320 may comprise specific data or routines utilized in the operation of platform 110, client application 150 and/or device; for example: sleep mode, power on and off in addition to bitmaps, layouts and other libraries of information that are stored on the device or the means for accessing the same.

Graphics module 330 may comprise the information, instructions or knowledge with regard to utilizing specific files such as JPEGs, bitmaps or other graphic data that could be utilized by user interface 140 in its rendering of a user interface on a device. The graphics module 330 may retrieve these files from resource module 320.

Event module 340 may comprise a library of information, instructions or knowledge with regard to identifying actions or occurrences as may be detected by a particular program such as user actions (e.g., pressing a key) in addition to system occurrences (e.g., an internal calendar alarm) and how to translate them across various environments (e.g., as if they were executed in a native environment).

Sound module 350 may comprise the information, instructions or knowledge of how to play or emit various sounds (e.g., WAV files) to be generated in response to, for example, the occurrence of certain system events (e.g., system warnings concerning low battery power). Sound module 350 may retrieve that particular file from the resource module 320.

Abstraction layer 310, as it corresponds to abstraction layer 120 (FIG. 1A) and abstraction layer 250 (FIG. 2A) may comprise additional or fewer modules as is required by the particular platform 110 and/or device and/or client application 150. It should also be noted that while FIG. 3 illustrates various modules as separate elements, this is not to suggest the requirement of a physical differentiation or a general lack of integration in an embodiment of the present invention.

Figure 4:
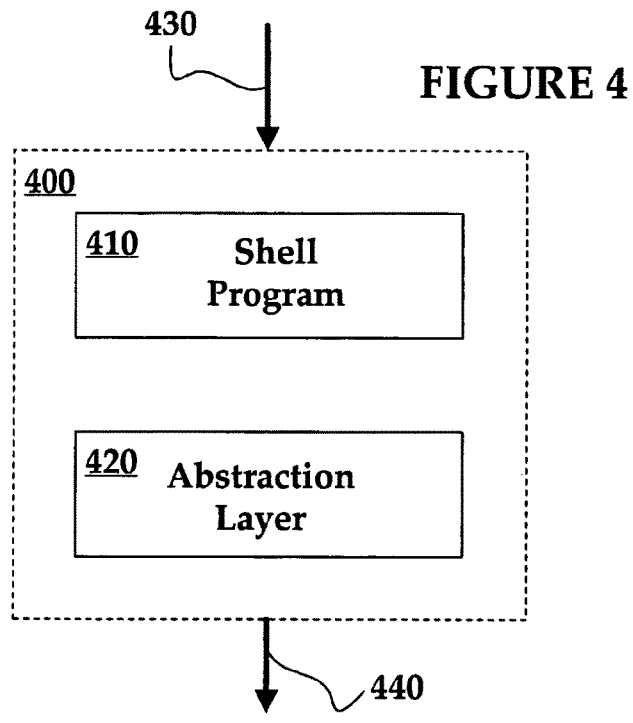
FIG. 4 illustrates an exemplary embodiment of a virtual platform comprising a shell program and an abstraction layer as may be utilized in the present invention.

FIG. 4 illustrates an exemplary embodiment of a virtual platform 400 for event management and translation comprising a platform-specific shell program 410 and an abstraction layer 420. In some embodiments of the present invention, the abstraction layer 420 and shell program 410 may be a single module of software.

Abstraction layer 420 is similar to the layer described in FIG. 3. Abstraction layer 420 interacts with the shell program 410 to effectively translate or otherwise offer portability of commands or instructions issued by a device-neutral interface or other platform environment as if the commands were actually issued in the native platform associated with the client. For example, if an event 430 (e.g., a button press) occurs in a particular platform environment (e.g., the Nokia Series 40 Developer Platform) that event 430 might—and likely will—substantially differ in structure and content (i.e., syntax) relative a different platform (e.g., the Palm OS®).

Virtual platform 400 is capable of normalizing the syntax (e.g., code) of the two different platform environments into a common format (e.g., a common syntax format with reliable semantic structure). That is, the virtual platform 400, in conjunction with abstraction layer 420, provides the necessary translation so that the syntax of the two platforms (e.g., code related to the button press) may be reconciled to achieve the related semantic purpose (e.g., invoking the opening of a particular menu or activating a backlight as associated with a soft key selection event 430) in, for example, a device-neutral interface.

The event 430 or certain information generated by the event 430 (e.g., a notification of the event) is, in certain instances, intercepted by the shell program 410. In some instances, the event 430 may be 'passed' upon by the shell program 410. This 'pass' may be the result of the event 430 not requiring 'translation' or platform 400 and shell program 410 not being concerned with the particular event 430. This 'pass' determination may be the result of certain manual programming of the platform 400 before or after it leaves an original equipment manufacturer or as the result of training, updating by the user or installation of software patches and the like.

The shell program 410, should it intercept the event 430, prevents the event 430 or the information generated by the event 430 (e.g., a notification of the event) from being immediately processed by any other relevant logic on the actual device or platform. The abstraction layer 420 then processes the event 430 intercepted by the intermediary shell program 410 and determines the proper response, reaction and/or instruction 440 to the event 430 for the particular device and/or platform hosting virtual platform 400.

The proper response, reaction and/or instruction 440, in some instances, will be to translate the event 430. The proper response 440, in other instances, will be to pass the event 430 on to some other aspect of the device for management. The proper response 440, in yet another instance, may be to 'null' the event 430 and not allow it to be processed or translated by the platform 400 and/or any other element of the device.

An event 430 generally falls into one of three categories. The first category may generally be described as a one-to-one translation. That is, the event 430 occurs and results in a particular reaction. For example, a button is pressed and a character (eventually) appears on the screen. This reaction is the result of the event 430 (or a notification of the event 430) notifying the appropriate device elements of the occurrence (the button press) and/or invoking the necessary code and/or routines to generate, for example, the aforementioned character.

It should be understood that the event 430 and the eventual response 440 are not necessarily a direct relationship (e.g., the button press does not directly cause the appearance of a character on the screen). The button press, instead, may be recognized by the device, a notification of the recognition of the occurrence thereby causing the execution of certain instruction sets that, in turn, cause a display or graphics module to render the letter 'A' on the display screen.

The second category of event 430 may generally be described as a synthetic event. In this instance, an action is recognized but the related function is not immediately present. The function, in this instance, must be synthesized to correspond to the event 430. For example, a particular command in an interface environment may be recognized but not present on a particular device. In this case, the issuance of the particular command causing the device to undertake the desired action would be synthesized and executed.

The third category of event 430 may be described as an ad hoc synthetic event wherein a series of actions occur internally. That is, one event 430 (the button press) results in the generation of a second event 430 (the execution of command code), which in turn results in the occurrence of some action by another element (e.g., hardware or a software module) of the device.

It should be noted that in some instances, the proper response/reaction 440 may be inaction. That is, the platform 400 does nothing in response to the event 430. Similarly, the platform 400 may take 'wait-and-see' approach and wait for the occurrence (or non-occurrence) of a subsequent event 430. This 'wait-and-see' approach would be apropos in the instance of a timer-related situation such as triple-tap text entry. Ultimately, the appropriation response/reaction 440 will be dependent upon the context of the event 430 as may be governed by, for example, a particular software application.

For example, the aforementioned button-press in a Nokia Series 40 Developer Platform operating environment may be equated to activating a backlight for a display screen. In another operating environment, however, the button press may be associated with sending a device into a 'sleep' state or may lack an associated function altogether. Absent the virtual platform 400, a user-interface would be unable to communicate the semantic content of the button press (e.g., undertake a particular action or cause a particular result) to both the Nokia platform and an alternate platform, such as the Palm OS®, as the syntax between the two platforms would differ.

Utilizing the virtual platform 400, however, the shell program 410 (in a Nokia platform environment, for example) would intercept and recognize the button press event 430 as indicative of the user's desire to enter sleep mode and communicate with the abstraction layer 420 in order to translate the event 430 into the proper response 440 for a Nokia-related device, which may normally be associated with a double press of another button. Similarly, the same virtual platform 400, when installed on a Palm OS® device could aid in translating the event 430 into a response 440 as recognized by a Palm OS® related device. A command issued by or in the context of a non-native device-neutral interface is recognized and translated, if necessary, for processing as if initially issued in the native device/platform environment. For example, a user could issue a sleep command as associated with a particular button as proffered by the device-neutral user interface and that button press, in part because of virtual platform 400, will be translated and recognized on a multitude of devices and/or platforms.

Figure 5:
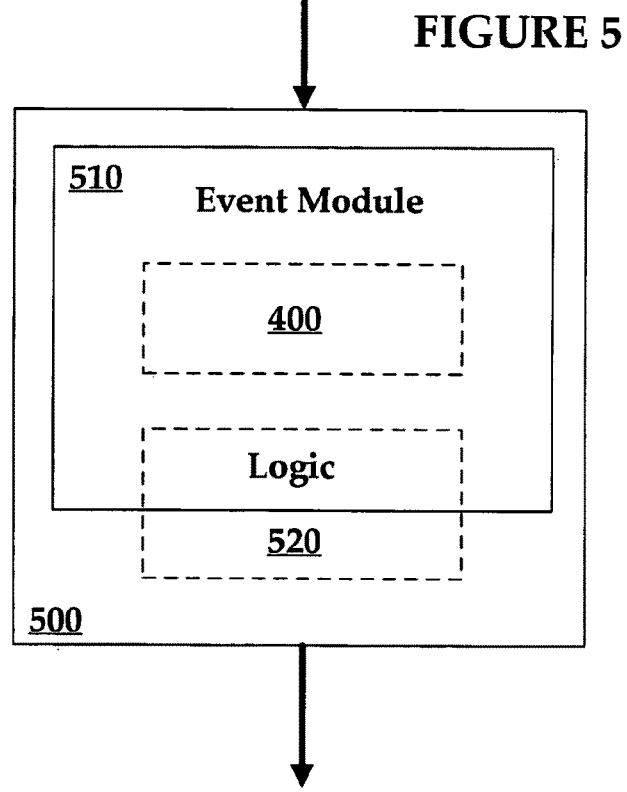
FIG. 5 illustrates a cross-platform event engine as may be utilized in an exemplary embodiment of the present invention.

FIG. 5 illustrates a cross-platform event engine 500 as utilized in an exemplary embodiment of the presently described device-neutral user interface. Cross-platform event engine 500 comprises an event module 510 and related logic 520. Logic 520 may reside directly in the event module 510 or may be resident in other aspects of the engine 500 or the device. In FIG. 5, logic 520 is illustrated as residing in both the event module 510 and also in the greater event engine 500. The particular location of logic is not of particular consequence so long as the appropriate logic 520 is accessible by the engine 500 as needed. In that regard, logic 520 may also be present in individual hardware elements or software modules of a device.

An embodiment of the cross-platform event engine 500 translates and manages events 430 occurring in/on or in relation to a particular device and/or device-neutral interface (e.g., key down, up, or center press) into a syntax recognizable by the particular device wherein the interface (and its engine 500 and virtual platform 400) are operating. The cross-platform event engine 500 further ensures the presence and standardization of certain events (e.g., press-and-hold and key repeats) via synthesis, if necessary.

Event module 510 comprises information as it pertains to the recognition of certain events on various devices and/or platforms and to translate these events into a common syntax recognizable by the device so that the semantic content of the event is achieved or communicated to another element of the device. These events include information obtained from event module code and external sources of data, both on and off the device. For example, event module 510 may be programmed to correlate a press of a particular button (e.g, the '1' number key on a certain device or in a certain platform environment) to result in a translation notification for the mobile device to activate its telephone functionality and automatically dial into a voice mail account assigned to that particular mobile device. This occurrence is the result of translating that event and its intended semantic result (the button press causing voice mail access) into a syntax comprehensible by the particular device. That is, button press '1' (in the context of the device-neutral interface) is mapped to telephone and voice mail functionality. In this way, a user may correlate certain actions to certain results notwithstanding the particularities of a given operating platform and/or environment (e.g., button press of '1' will always result in voice-mail access).

While an embodiment of event module 510 may comprise an abstraction layer (420) and logic 520, event module 510 may not necessarily include the aforementioned shell program 410, the program (in certain embodiments) being incorporated as a part of the abstraction layer 420 or some other aspect of event engine 500.

The information residing in the event module 510 and pertaining to event translation and management can be installed by an original equipment manufacturer or may be subject to user adjustment (e.g., deactivating default settings and/or imposing new settings) or subsequent software installations (e.g., upgrades and software patches). Information in the event module 510 may also be updated automatically during the operation of the device (e.g., wirelessly) or configured as the result of intelligent determinations by the engine 500.

For example, if the event module 510 determines that it is resident on a device for which it does not know what result should/will be triggered by the press of the '1' key, the event module 510 can make certain assumptions based on a particular series of a device but not the exact model. That is, by analyzing operational parameters of similar devices (that information residing in the module 510 or otherwise accessible by the module 510), the event module 510 may assume and provide relevant information from which logic 520 and cross-platform event engine 500 can collectively translate an event input.

For example, a family of devices may recognize a press of the '1' key as triggering (via a series of internal events) voice mail functionality. As a present device may be similar to, or even a member of, this device family, the present device utilizing the event engine 500 may translate the press event in a similar manner, that is, activating voice mail functionality.

The event module 510 may also receive updates with regard to device information or code during a synchronization/update/communication operation/event with another source of data/information (e.g., a P2P network, desktop PC, or server that hosts information pertinent to the device's operation). Updates may be acquired automatically or as a result of user action (e.g., affirmatively downloading an upgrade or patch from the appropriate provider of that information such as the device manufacturer or the platform-neutral interface designer). Such updates, as previously suggested, may also be received wirelessly over a wireless network from a corresponding data source.

The event module 510 may also request the user manually provide this information if an assumption or synchronization/update/communication operation/event fails to provide or otherwise obtain the necessary information.

Events and their related notifications (if any) need not be of any particular format or language so long as the event may be processed by the cross-platform engine 500 with regard to determining whether a particular application, sub-event, display, sound, etc. should be ultimately be executed. The same holds true for a proper response/reaction 440.

An embodiment of the cross-platform event engine 500 also comprises aforementioned logic 520 although other embodiments of the present invention allow for logic 520 to be located elsewhere on the device. The logic 520, based on an event input, interacts (e.g., query/reply) with event module 510 to determine if the particular event input may be processed on the particular device (e.g., a one-to-one translation) or if some adjustments will be required (e.g., synthesis) with regard to the particular configuration of the device as set forth in the event module 510. For example, logic 520 will, in conjunction with event module 510, determine: (1) if an event can be processed by the device and if it should; (2) if the event cannot be processed by the device but it should; and (3) if an event should not be processed by the device and to ensure that it is not. Logic 520 determines what to do with an event (i.e., what action, reaction, inaction is warranted?): allow the event module 510 to carry out an action in response to event or allow some other aspect of the device (e.g., the client) to carry out an action in response to the event.

If logic 520 determines that the event input can be identified and should be processed and subsequently executed, the event input will be processed (e.g., standardized with regard to syntax) by event module 510 as to allow for the proper reaction/response to take place in the device (e.g., one-to-one translation or a 'pass' of the event).

For example, the user presses the '1' key (event input). The cross-platform event engine 500 will accept the event input and the logic 520 will communicate with the event module 510 with regard to the event engine 500 having received this particular input. If the logic 520 determines that the event should be processed, the event module 510 (presuming it to have been programmed with this particular information) will recognize that on the present device, a press of the '1' key is meant to execute a telephone call to the user's voice mail. The event engine 500 will communicate the identification of this event to the appropriate elements of the device ultimately resulting in the activation of telephone functionality and a telephone call to the user's voice mail.

Should logic 520 and event module 510 determine that the requested operation is not immediately compatible with the present device (e.g., the device does not utilize a hard key press for voice mail access but a soft key selection, logic 520 may determine that a query to event module 510 is necessary to determine what the particular configuration of the device allows for the identical or similar operation and, if so, whether the particular event can be converted, translated or otherwise managed in such a way that will ultimately result in the invocation of an identical or similar operation.

For example, if the engine 500 recognizes that a hard key press is being executed, logic 520, after having accessed the event module 510 to determine what should be done with the key press event (that is, the notification of the event), may recognize that this particular event is usually associated with voice mail access. Logic 520, in conjunction with the event module 510, will determine that while voice mail access is possible on the present device, voice mail access is usually initiated via a soft key selection event. The cross-platform event engine 500 will convert the initial event into the proper request for the native environment (i.e., the operating system relative the device) whereby access to voice mail will eventually occur via the proper execution of other strings relative various elements in the device notwithstanding the fact that a differing input 530 syntax actually initiated the request on the device. That is, the semantics of the hard key press (access voice mail) is achieved via translation such that differences in syntax between the interface and device are overcome.

Information utilized by logic 520 and also for event module 510 as it pertains to translation and management of events may reside directly in the engine 500 or at a locale on the device accessible by the engine 500. For example, information pertaining to common events may be a permanently embedded part of logic 520 or in memory (not shown) accessible by the logic 520.

In certain embodiments, the logic 520 and event module 510 may be trained, whereby the engine 500 begins to recognize a particular event input without query to the event module 510 or a determination of how to handle to the event by logic 520. Through the training of the engine 500 and its various elements, there is no longer the need for unnecessary logic execution cycles or interactions with the event module 510 whereby the processing speed of an event by the engine 500 is normally decreased.

The logic 520 and/or event module 510, in some embodiments, may also be expressly instructed by the user (e.g., through pre-programming or a response to a query during processing) to respond to a particular difference in configuration as identified by the engine 500 in a particular manner. For example, if the event input pertains to the particular timing of a key press to invoke a particular application, the user may pre-program the logic engine 520 to automatically respond to that event relative the event module 510 as to launch that application (e.g., as a default) instead of logic 520 determining how to handle the event and subsequently interacting with the event module 510 to properly translate and/or manage the event. Such express instruction may also help avoid arrival at an erroneous result as to the particular nature of the event and how it may be processed in its native environment (e.g., the event module 510 improperly maps the event to a response/reaction on or in the device).

In that regard, the cross-platform event engine 500 can further be configured to recognize that the user of the device is perhaps most familiar with a particular operating system platform or mobile device. In that regard, the logic 520, in conjunction with event module 510, may recognize that an event is consistently mapped to a backlight function. The event invoking the backlight function may correspond to an event as would occur in a PalmOS® for that function. As such, the interface (via engine 500) may be reconfigured to reflect a PalmOS®-type interface and also default map as if events were occurring in a PalmOS® environment. Through such re-mapping, in the event there is a disparity as to what event a user actually seeks to execute through an event input, those events that relate to the user's more familiar platform or device are considered and/or invoked prior to considering any other particular events as they relate to less familiar devices or platforms (e.g., the engine 500 may query the user if they wish to operating in Palm-mode).

For example, a first device may associate a particular key press with attempting to access voice mail. A second device may associate the same key press with launching an electronic mail program and wirelessly accessing the Internet. In an interface comprising cross-platform event engine 500, the event module 510 will be programmed with information concerning events as they relate to both devices (e.g., a key press relating to voice mail on the first device and electronic mail on the second). When the event input (button press) is received by the cross-platform event engine 500, logic 520 will determine what to do with the event and, if appropriate, query the event module 510 to direct the notification of the key press to the appropriate element of the device (e.g., a voice mail module or an e-mail module) and to translate the notification into a syntax recognized by the device. Having been previously programmed to note or learn/been trained that the user formerly was a 'first device' user, however, logic 520 will determine to send the proper notification to the voice mail module and the event module 510 will convert the input into a syntax compatible with voice mail access thereby resulting in voice mail access (through appropriate instruction/action/reaction) rather than electronic mail and Internet access as would be appropriate had the user been a former 'second device' user.

An embodiment of the cross-platform event engine 500 also allows for cross-platform representation of strings and other executables.

As noted, the event module 510 of the cross-platform event engine 500 may be integrated with the virtual platform 400 and its abstraction layer 420 that allows for the interoperability of a device-neutral user interface on any variety of devices and/or platforms. This integration may also include integration with other engines such as a layout engine as described in U.S. provisional patent application No. 60/661,757, which has been incorporated herein by reference. While the cross-platform event engine 500 and virtual platform 400 need not necessarily be physically integrated, the platform-neutral user interface of the present invention requires that the two components at least be capable of communicating with one another as to allow for the translation of what may be a foreign instruction into an instruction otherwise comprehensible by the cross-platform event engine 500.

The above-described embodiments are exemplary. One skilled in the art will recognize and appreciate various applications of the disclosed invention beyond those presently described here. This disclosure is not meant to be limiting beyond those limitations as expressly provided in the claims.

What is claimed is:

1. A method for executing a device-neutral interface on a device, the method comprising:
    recognizing that an event detected at the device by the device-neutral interface is not compatible with the device;
    identifying a result that is associated with the event;
    translating the event into a syntax recognizable by the device which when processed causes the device to effectuate the result that is associated with the event.

2. The method of claim 1,
    wherein, the translating includes normalizing differing syntaxes among different platform environments into a common format reconcilable by the device.

3. The method of claim 2, further comprising:
    storing information that indicates the result is associated with the event;
    storing syntax information that indicates that the syntax will cause the device to effectuate the result.

4. The method of claim 3, wherein the information and the syntax information are provided by an original equipment manufacturer.

5. The method of claim 3, wherein the semantic information and the syntax information are user specified and are re-configurable.

6. The method of claim 3, wherein the semantic information and the syntax information are provided during a communication event.

7. The method of claim 3, wherein the semantic information and the syntax information are derived as the result of an assumption based on operational parameters of other devices similar to the device.

8. The method of claim 2, wherein the result includes a user interface result including, one or more of, opening a menu, activating a backlight, and entering sleep mode.

9. The method of claim 1, wherein the event is generated by a hardware or software platform of the device, or caused by user input.

10. The method of claim 1, wherein the translating the event into a syntax recognizable by the device includes issuing a command which would cause the result to effectuate at the device.

11. The method of claim 1, wherein the event results from a key press or a touch-screen input at the device.

12. A system, comprising:
    means for recognizing that an event occurring in a device-neutral interface of a device is not compatible with the device;
    means for determining a semantic result that is associated with the event;
    means for translating the event into a syntax recognizable by the device which when processed causes the device to effectuate the semantic result that is associated with the event;
    wherein the event results from a touch-screen input of a user at the device.

13. The system of claim 12, further comprising:
    means for normalizing differing syntaxes among different platform environments into a common format reconcilable by the device.

14. The system of claim 12, further comprising:
    means for storing semantic information that indicates the semantic result associated with the event;
    means for storing syntax information that indicates that the syntax will cause the device to effectuate the semantic result.

15. The system of claim 14, wherein the semantic information and the syntax information are provided by an original equipment manufacturer.

16. The system of claim 14, wherein the semantic information and the syntax information are provided by a user.

17. A device, comprising:
    a processor; and
    a memory device including instructions that, when executed by the processor, cause the processor to:
    recognize that an event is not compatible with the device;
    determine a result that is associated with the event; and
    translate the event into a syntax recognizable by the device which when processed causes the device to effectuate the result that is associated with the event;
    wherein the result includes a user interface result.

18. The device of claim 17, wherein the instructions further cause the processor to:

normalize differing syntaxes of different platform environments into a common format such that the semantic result is achieved on the device.

19. The device of claim 17, wherein the instructions further cause the processor to:
- access semantic information that indicates that the semantic result is associated with the event;
- access syntax information that indicates that the syntax will cause the device to effectuate the semantic result.

20. The device of claim 19, wherein the semantic information and the syntax information are provided by a communication event.

21. A method for executing commands that are non-native to the native environment of a mobile device, the method comprising:
- detecting a command at the mobile device;
- identifying the command as being non-native to the native environment of the mobile device;
- translating the command for processing by the mobile device as if initially issued in the native environment of the mobile device.

\* \* \* \* \*